(12) United States Patent
Mather et al.

(10) Patent No.: US 9,878,487 B2
(45) Date of Patent: *Jan. 30, 2018

(54) MULTI-SHAPE PRODUCT

(75) Inventors: Patrick Mather, Manlius, NY (US);
Xiaofan Luo, Cleveland, OH (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/039,757

(22) Filed: Mar. 3, 2011

(65) Prior Publication Data

US 2011/0217547 A1    Sep. 8, 2011

Related U.S. Application Data

(60) Provisional application No. 61/310,114, filed on Mar. 3, 2010.

(51) Int. Cl.
| | | |
|---|---|---|
| B32B 27/04 | (2006.01) | |
| B32B 5/02 | (2006.01) | |
| B29C 61/06 | (2006.01) | |
| B29C 61/00 | (2006.01) | |

(52) U.S. Cl.
CPC ........ B29C 61/0633 (2013.01); B29C 61/003 (2013.01); *Y10T 428/249921* (2015.04); *Y10T 428/269* (2015.01)

(58) Field of Classification Search
CPC .......... B32B 17/02; B32B 17/04; B32B 3/26; Y10T 428/24993; Y10T 428/24994; Y10T 428/249994; Y10T 428/24992; B29C 61/0633; B29C 61/003; B29C 61/0658; C08G 18/4277; C08G 2280/00; A61F 2210/0014; A61F 2202/20092; D04H 1/728; D01D 5/007; D01D 5/0061–5/0062
USPC .................. 442/327–417; 428/364, 903, 907
See application file for complete search history.

(56) References Cited

U.S. PATENT DOCUMENTS

| | | | | |
|---|---|---|---|---|
| 5,098,776 | A  * | 3/1992 | Kobayashi et al. .......... | 442/104 |
| 6,156,842 | A  * | 12/2000 | Hoenig ................... | C08L 23/08 |
| | | | | 428/373 |
| 8,388,994 | B1 * | 3/2013 | Scheer et al. .................. | 424/423 |
| 8,394,393 | B2 * | 3/2013 | Mather et al. ................ | 424/400 |
| 2006/0153904 | A1 * | 7/2006 | Smith et al. .................. | 424/448 |
| 2006/0263417 | A1 * | 11/2006 | Lelkes et al. ................. | 424/443 |
| 2008/0262188 | A1 * | 10/2008 | Xie et al. ........................ | 528/98 |

(Continued)

OTHER PUBLICATIONS

Luo, X, et al. Preparation and Characterization of Shape Memory Elastomeric Composited. In: Macromolecules,2009, vol. 42, pp. 7251-7253, see pp. 7251-7252.

(Continued)

*Primary Examiner* — Camie S Thompson
(74) *Attorney, Agent, or Firm* — Bond Schoeneck & King, PLLC; David Nocilly; George R. McGuire

(57) ABSTRACT

Multi-shape products of the present disclosure comprise two components: a matrix component and a fiber component that is embedded or otherwise disposed in the matrix component. The matrix component exhibits certain shape memory properties. The fiber component interpenetrates the matrix component to facilitate fixing of the multi-shape product in various temporary shapes.

18 Claims, 19 Drawing Sheets

(56) References Cited

U.S. PATENT DOCUMENTS

2008/0314510 A1* 12/2008 Hood ............... B29C 35/0272
                                                    156/221
2009/0112236 A1*  4/2009 Stopek ..................... 606/151
2009/0306767 A1  12/2009 Lendlein
2009/0309258 A1  12/2009 Lendlein
2010/0028683 A1   2/2010 Xie et al.
2010/0044920 A1   2/2010 Bellin et al.
2010/0256777 A1* 10/2010 Datta et al. ............... 623/23.72
2011/0008596 A1   1/2011 Kratz et al.
2011/0021097 A1*  1/2011 Mather et al. ............... 442/60
2011/0173971 A1*  7/2011 Mather et al. ............... 60/528

OTHER PUBLICATIONS

Xie, T. et al. 'Facile Tailoring of Thermal Transition Temperatures of Epoxy Shape Memory Polymers.' In: Ploymer, 2009 vol. 50, pp. 1852-1856, see whole document.

Xie, T., et al. 'Revealing Triple-Shape Memory Effect by Polymer Bilayers.' In: Macroml, Rapid Commun., 2009 vol. 30, pp. 1823-1827, see whole document.

Bellin, I, et al., 'Polymeric Triple-Shape Materials.' In: Proc. Nat. Acad. S. ci., 2006 vol. 103, pp. 18043-18047, see whole document.

* cited by examiner

MULTI-SHAPE PRODUCT

CROSS-REFERENCE TO RELATED APPLICATIONS

This application claims the benefit and priority under 35 U.S.C. § 119(e) to U.S. Provisional Patent Application Ser. No. 61/310,114, entitled "Stimuli-Responsive Product Having Multi-Shape Properties" and filed on Mar. 3, 2010 (hereinafter, "the Provisional Application"). The content of the Provisional Application is incorporated by reference in its entirety herein.

BACKGROUND

Technical Field

The present disclosure relates generally to shape memory materials, and more particularly, to embodiments of a multi-shape product that can affix in a plurality of temporary shapes.

Description of Related Art

Shape memory materials include shape memory polymers ("SMPs"). Manipulation of these polymers can "fix" a temporary shape and later recover to an original, "memorized" permanent shape upon heating (See references 1-4 below). A typical shape memory cycle ("SMC") involves first deforming the SMP in its rubbery state at an elevated temperature. This deformation is elastic in nature and mainly results in a decrease in conformational entropy of the constituent polymer network chains. Vitrification or crystallization, which is triggered by cooling the deformed material, kinetically traps the SMP in its low-entropy state due to a significant reduction of chain mobility. Macroscopically the material retains its temporary shape even after releasing the external stress. Reheating the material later initiates shape recovery under stress-free or loaded conditions. Heating allows relaxation of polymer chain segments (with regained mobility) to their original, entropically-favored conformational state.

The field of SMPs has grown rapidly. Much of this growth is due to the intrinsic versatility of SMPs which permits implementation of SMPs in many applications ranging from actuators to sensors to medical devices. A number of materials exhibit unprecedented properties that greatly extend the scope of traditional SMPs. With regard to triggering mechanisms (e.g., the external stimulus), in addition to direct heating, SMPs are also responsive to light, electricity, moisture, solvents, and magnetic fields (See, respectively, references 5-9 below).

Some SMPs have unique recovery characteristics. For example, "two-way" shape memory SMPs exhibit reversible actuation capabilities. These capabilities are reported for liquid crystalline elastomers (LCEs) and semi-crystalline networks (See references 10-12 below). Examples of "triple-shape" SMPs, discussed more below, exhibit two separate transitions with three different shapes (See references 10 and 13-16 below). However, unlike conventional "dual-shape" SMPs, which only recover from a temporary shape to a permanent shape, triple-shape SMPs can fix at least two temporary shapes and recover sequentially from one of the temporary shapes to the other and, eventually, to the permanent shape. Recovery occurs in response to applied stimuli, e.g., heating.

SMPs with triple-shape properties often feature two separate shape-fixing mechanisms. The mechanisms are distinguished, in one example, by separate thermal transitions in a temperature range associated with the application in which the material is implemented. The separate thermal transitions lead to a cascade of three elastic modulus plateaus, wherein each plateau is of decreasing magnitude in response to increasing temperature.

Various approaches are known to implement triple-shape properties and features in shape memory materials. These approaches occur at both the molecular and macroscopic level. At the molecular level, Bellin et al. disclose two copolymer networks (See references 14 and 15 below). These networks encompass (1) poly(ε-caprolactone) (PCL) segments with grafted, short poly(ethylene glycol) (PEG) side chains, and (2) main-chain poly(cyclohexyl methacrylate) (PCHMA) cross-linked with di-functional PCL macromers. The resulting shape memory material shows well-separated thermal transitions from (1) PCL $T_m$ (50-60° C.) and PEG $T_m$ (17-39° C.) and (2) PCL $T_m$ (50-60° C.) and PCHMA $T_g$ (~140° C.) and can separately fix two temporary shapes in a programmed thermo-mechanical cycle.

Also at the molecular level, Mather et al. describe a homopolymer (rather than copolymer) such as a poly(2-tert-butyl-1,4,-bis[4-(4-pentenyloxy)benzoyl]hydroquinone) (P5tB) liquid crystalline network ("LCN") (See reference 10 below). The LCN can fix two temporary shapes through first isotropic-nematic transition (~150° C.) and then glass transition (~80° C.). Heating the fixed sample leads to complete and sequential recovery of the temporary shapes in reverse order.

Macroscopically, Xie et al. report on triple-shape behavior in polymer bi-layers composed of epoxy thermosets with two different transition temperatures (e.g., glass transition temperature $T_g$) of 38° C. and 75° C. (See references 16 below). The triple-shape properties of these bi-layers are characterized under bending deformations and are shown to be easily tuned by varying the thickness ratio of the two layers. However, the intrinsic asymmetry of this approach may render the resulting shape memory material (and thus its shape memory properties) sensitive to the direction of the load.

Nonetheless, although the materials above exhibit triple-shape properties, each has limitations that may preclude or limit the applications for which and in which the materials can be applied.

SUMMARY

There is a need, therefore, for a multi-shape product, composition, and method of fabrication and fixation, which takes advantage of commercially-available materials and which results in a robust material with multi-shape properties that can be tuned based on the application in which the material is implemented. As discussed more below, and broadly stated, embodiments of multi-shape products of the present disclosure permit multi-shape, multi-phase, and/or or multi-property fixing such as between two temporary shapes. Examples of these products permit sequential recovery from one temporary shape to the next and, eventually, to a permanent shape. Recovery can occur upon activation or stimulation from outside stimuli such as heat.

These features are beneficial because products of the present disclosure can conduct two-stage actuation and/or two-stage sensing, as well as being so configured to be used as multi-shape (e.g., dual-shape) SMPs with fully controlled starting and final shapes. Moreover, when compared to other materials that exhibit multi-shape features, the embodiments discussed below and described (and contemplated) herein have superior performance. This performance enables larger degrees of design flexibility, and in one embodiment this flexibility permits individual tuning of the functional components of the products to control the overall properties (e.g., transition temperatures, recovery stress, and other functions).

BRIEF DESCRIPTION OF THE DRAWINGS

So that the manner in which the above recited features of the present disclosure can be understood in detail, a more particular description of the embodiments, briefly summarized above, may be had by reference to the drawings some of which are illustrated and described in the accompanying figures. It is to be noted, however, that the appended figures illustrate only typical embodiments and are therefore not to be considered limiting of the scope and spirit of the subject matter disclosed herein, for the embodiments may admit to other equally effective embodiments.

Thus, for further understanding of the nature and objects of the disclosure, references can be made to the following detailed description, read in connection with the drawings in which.

Any drawings are not necessarily to scale, emphasis generally being placed upon illustrating the principles of certain embodiments of disclosure. Moreover, where applicable like numerals are used to identify like components as between the embodiments.

DETAILED DESCRIPTION

Figure 1:
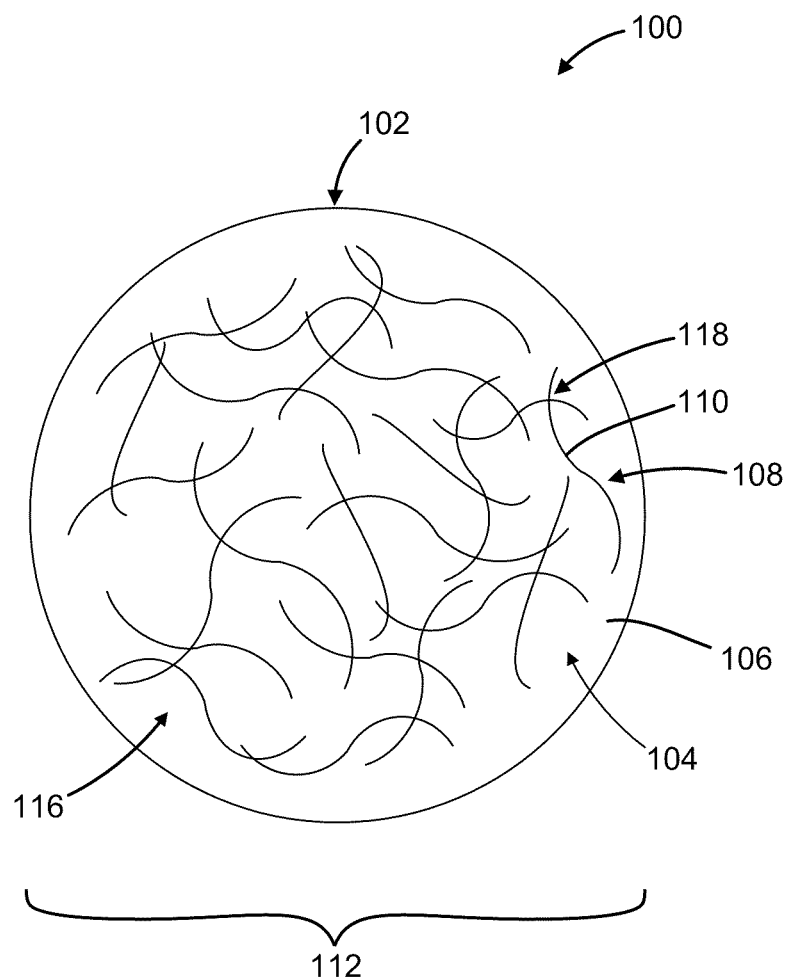
FIG. 1 is a side, cross-section view of an exemplary embodiment of a multi-shape product.

Multi-shape products of the present disclosure comprise two components: a matrix component and a fiber component that is embedded or otherwise disposed in the matrix component. The matrix component may exhibit certain shape memory properties. The fiber component interpenetrates the matrix component to facilitate fixing of the multi-shape product in various temporary shapes.

The discussion that follows is broken into six sections, which include (1) Embodiments of the Provisional Application, (2) Related Embodiments, (3) Experimental Results, (4) Experimental Implementation, (5) Additional Embodiments, and (6) References.

(1) EMBODIMENTS OF THE PROVISIONAL APPLICATION

The Provisional Application describes various embodiments of the disclosed materials. As mentioned above, the present disclosure incorporates the content of the Provisional Application by reference herein. The following section refers to the content to clarify the concepts prevailing at the time application for patent was made and to ground the discussion in the sections entitled Related Embodiments and Additional Embodiments.

This disclosure introduces new and broadly applicable materials and methods for designing and fabricating multi-shape products. Embodiments of such products may comprise triple-shape polymeric composites ("TSPCs") with well-controlled properties. These composites comprise in one embodiment electrochromic nanocomposites formed by electrospinning and/or similarly structured shape memory elastomeric composites ("SMECs") (See, respectively, reference 17 and 18 below). In one example, a fiber component such as non-woven poly($\epsilon$-caprolactone) ("PCL") microfibers are electro-spun and incorporated into a matrix component such as a continuous silicone rubber (e.g., Sylgard 184; $T_g \sim -120°$ C.). The matrix component can be elastomeric at room temperature while displaying excellent shape memory properties (e.g., dual-shape) triggered in one example by the crystallization and melting transitions of, e.g., the nonwoven PCL microfibers.

The resulting material has a large interfacial area formed by the percolating non-woven PCL fiber/matrix morphology (also referred to as a "percolating matrix," a "fiber matrix," and a "fiber component matrix"). This morphology facilitates load transfer and load distribution that can lead to enhanced shape-fixing. As discussed more below, embodiments of multi-shape products (and related materials, compositions, and methods) with different triple-shape properties can be achieved through selection of the matrix component (also referred to as a "composite matrix," a "shape memory component," an "SMP," and an "SMP matrix") such as a $T_g$-based SMP. In one example, the selection introduces at least one more transition (in addition to transition(s) of the fiber component such as the PCL $T_m$) to the system which can be used to fix another temporary shape.

The fabrication and characterization of embodiments of multi-shape products comprise triple-shape polymeric composites ("TSPCs") that, unlike traditional shape memory polymers ("SMPs"), are capable of fixing at least two (2) temporary shapes and recovering sequentially such as from a first temporary shape to a second temporary shape and, eventually, to a permanent shape under action of an applied stimuli such as upon continuous heating. These features are achieved in practice by incorporating in one example nonwoven thermoplastic fibers with an average diameter of about 760 nm of a low-$T_m$ semi-crystalline polymer into a $T_g$-based SMP matrix. The resulting composition from this exemplary combination can display two well-separated transitions, where one transition results from the glass transition of the matrix and the other transition results from the melting of the fibers, which are subsequently used for the fixing/recovery of two temporary shapes.

Details of this and other embodiments, as well as thermo-mechanical programming processes with different shape fixing protocols are proposed in the discussion that follows below. The intrinsic versatility of embodiments of the multi-shape and other stimuli responsive products that incorporate TSPC composition and similar approaches provide an unprecedented large degree of design flexibility for functional multi-shape polymers and systems.

FIG. 1 depicts Appendix A of the Provisional Application. There is shown in FIG. 1, for example, one exemplary embodiment of a product 100, which can comprise a composition 102 with a first component 104 such as a shape memory component 106 and a second component 108 such as a fiber component 110 dispersed in and intermixed with the shape memory component 106. This intermixing can form a pre-determined network 112, which can be characterized in the present example as a percolating fiber network 114 with a plurality of fibers 116 that can be adjoined such as at nodes 118 of the percolating fiber network 114.

In one embodiment of the product 100, the fiber component 110 can comprise one or more fibrous materials such as thermoplastic materials, and in one construction the fibrous materials are constructed of a semi-crystalline polymer and, more particularly, a semi-crystalline polymer with a low melting temperature $T_m$. Examples of these materials can include poly(ε-caprolactone) ("PCL"), as well as various derivations, compositions, and compounds thereof. In other examples, the material for the fiber component 110 is selected based on one or more material properties, including melting temperature $T_m$, and/or certain functional characteristics that are consistent with the multi-shape and multi-phase recovery products disclosed and contemplated herein.

In one embodiment of the product 100, the shape memory component 106 can comprise shape memory polymers and shape memory nanocomposites such as shape memory elastomeric composites ("SMECs"), nanofiber ion-exchange membranes, and transparent Nylon-4,6/epoxy composites. Epoxy and similar epoxy-based materials can also be used in whole or in part to form the shape memory component 106. Acrylic or methacrylic thermosets can also be used in whole or in part to form the shape memory component 106.

One exemplary construction can comprise a matrix (e.g., an SMP matrix) such as the SMP matrix provided in connection with the embodiment of product 100 discussed in the Experimental Results section below. Moreover, and to provide a clear and consistent understanding of the present disclosure, it is understood that a polymer and/or polymeric materials (hereinafter, "polymers") such as those used in embodiments of the product 100 can be substances that can comprise repeating molecular units, and in one example the polymers can contain more than 100 repeating molecular units. Polymers can also include those materials that comprise soluble and/or fusible molecules having long chains of repeat units. Polymers such as the polymers contemplated herein can also include materials that comprise insoluble and infusible networks.

Additional embodiments, examples, and constructions of multi-shape products are provided in the Examples 1-6 in the Experimental Results. This discussion, supplemented at least in part with the Experimental Implementation section below, also includes certain exemplary manufacturing processes, methods, and techniques applicable to the multi-shape products disclosed herein and in, for example, FIGS. 8-20. Other manufacturing processes can comprise vacuum bagging techniques.

Materials, compositions, and composites (collectively, "materials") identified herein are not limiting, but rather are provided to form a basis for the various materials that can be used in products such as the product 100 discussed above. Derivations and compositions of such materials are likewise contemplated to fall within the scope of the present disclosure, whereas such derivations exhibit or cause the product to exhibit one or more of the properties discussed herein. These derivations can be made by changing one or more of the building block components such as is known and recognized in the molecular arts.

(2) RELATED EMBODIMENTS

Features of multi-shape products (e.g., the product 100) discussed in the Provisional Application are embodied in products and/or materials that the inventors identify as having beneficial characteristics and which exhibit shape-memory properties indicative of, e.g., the composition 102. The embodiments discussed below include exemplary combinations of materials for the composition 102, and thereby benefit from, are closely related to, and are supported by the broader concepts of the Provisional Application.

Figure 2:
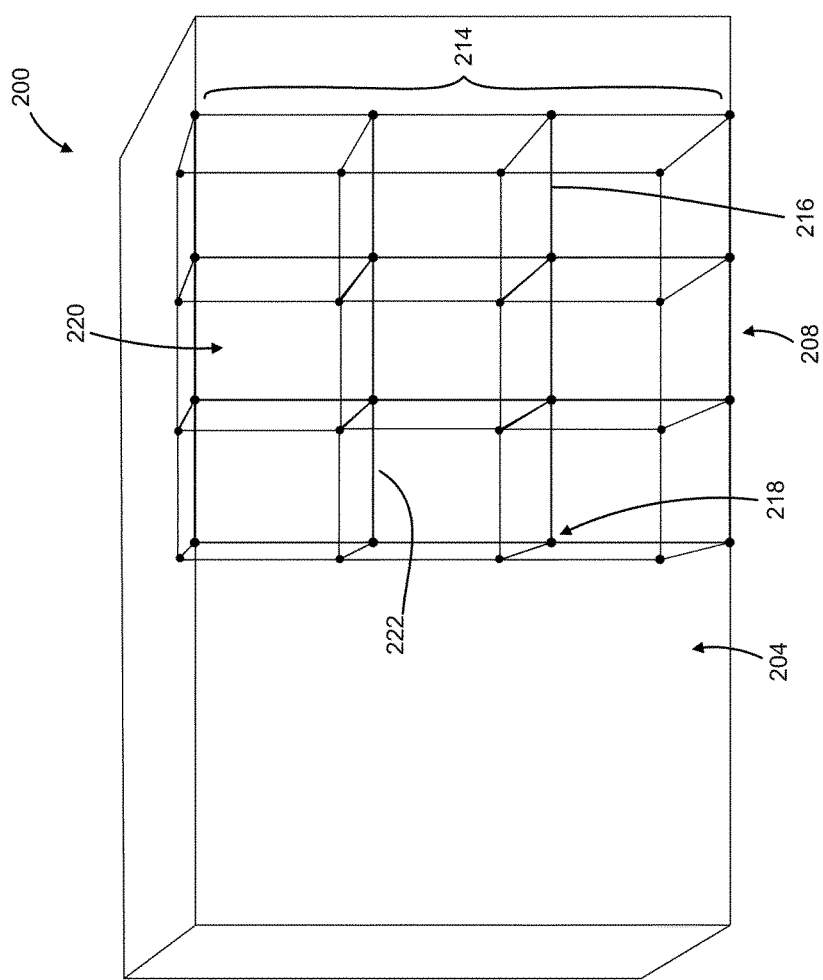
FIG. 2 is a perspective, schematic view of another exemplary embodiment of a multi-shape product in a non-deformed state.
Figure 3:
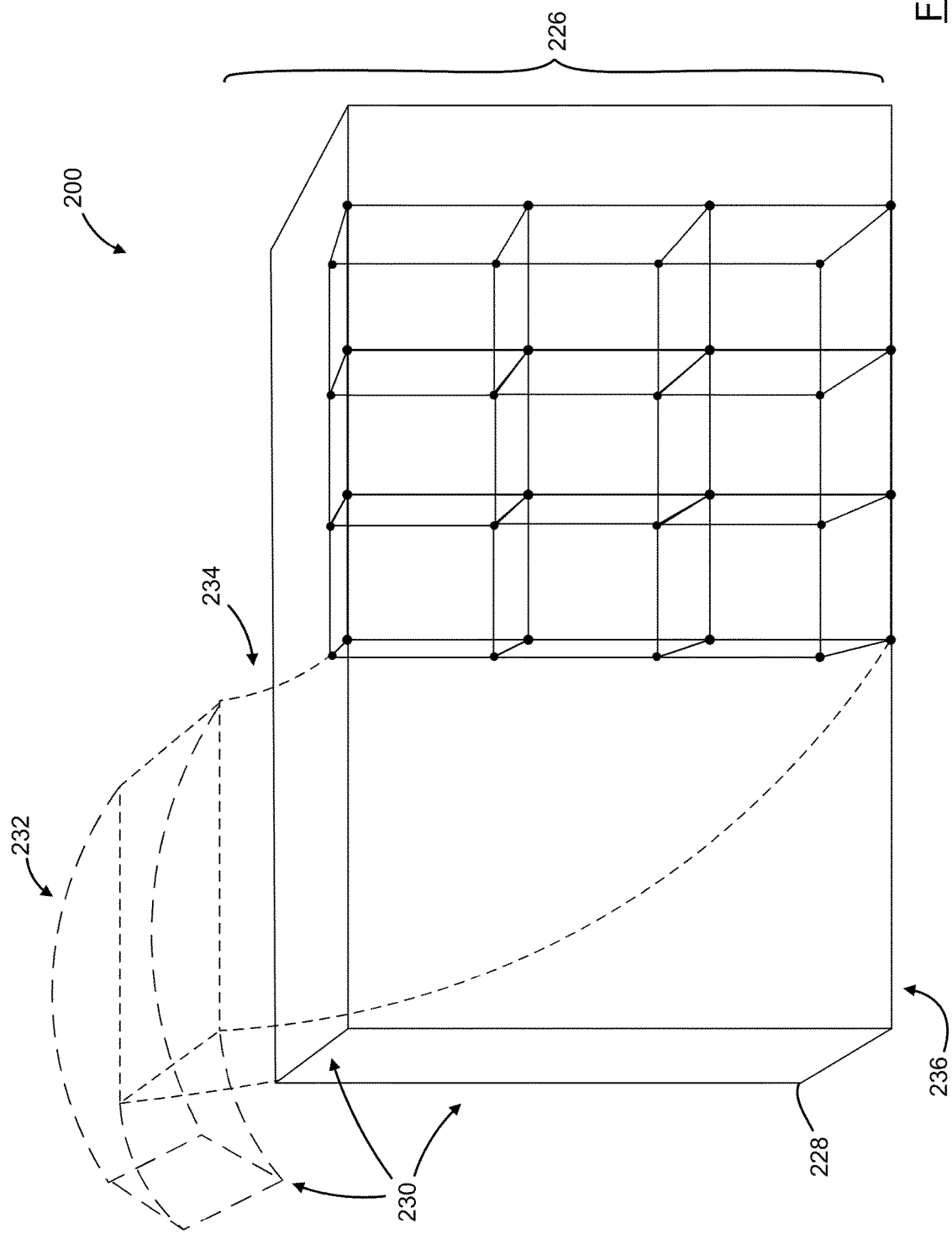
FIG. 3 is another perspective, schematic view of the multi-shape product of FIG. 2 in a deformed state.

FIGS. 2-3 depict an exemplary embodiment of a multi-shape product 200 that is made in accordance with such concepts Like numerals are used to identify like components as between FIGS. 1-3, except that the numerals are increased by 100 (e.g., 100 in FIG. 1 is now 200 in FIGS. 2 and 3). By way of example, and with reference first to FIG. 2, the product 200 comprises a composition 202 with a first component 204 (or "matrix component 204") and a second component 208 with a fiber component 210 dispersed in and intermixed with the matrix component 204 to form a percolating fiber network 214.

The fiber network 214 comprises one or more fiber(s) 216 and includes a plurality of nodes 218 where adjacent fiber(s) 216 are in contact with one another. Integration of the fiber(s) 216 and the nodes 218 forms a plurality of interstitial voids 220 or gaps within the fiber network 214 where material such as the matrix component 204 is found. An interface 222, which forms about each of the fiber(s) 216, defines an area of contact between the matrix component 204 and second component 208. As best depicted in FIG. 3, in one embodiment, the product 200 has a form factor 226, shown generally as a sheet or film 228. The film 228 has a plurality of shapes 230 including a first shape 232 (or "first temporary shape 232"), a second shape 234 (or "second temporary shape 234"), and a third shape 236 (or "permanent shape 236").

The form factor 226 has a variety of shapes and forms. For example, the film 228 can be rolled and/or folded into a rod, cylinder, cube, sphere, or block. In other constructions the fiber network 214 forms about a sacrificial material such as to form a cylinder, where the sacrificial material is thereafter removed to form the hollow center of a tube. Sheets and films such as the film 228 can be flexible, compressible, and resilient. In the present example, the film 228 is characterized by a length L, a width W, and a thickness T. The length L and width W may depend in some embodiments on the manufacturing processes and techniques selected to build the fiber network 214. The thickness T is from about 0.001 mm to about 1 mm. In other embodiments, the thickness T is defined as a multiple of the average diameter of the fiber(s) 216. Multiples contemplated are from about 5 to about 20, with the thickness T in one construction of the film 228 being at least about 10 times the average diameter of the fiber(s) 216.

The fiber(s) 216 can include fibers on the nano- and micro-scales (e.g., the fiber component 110 of the Provisional Application). In one embodiment the fiber(s) 216 have an average diameter of about 800 nm or less. The average diameter in other embodiments of the product 200 can be from about 50 nm to about 500 nm. Still other embodiments may have fibers with an average diameter of 100 μm or less. The use of such small fibers is beneficial because it provides a large surface area at the interface 222 at which contact with the matrix component 204 is made. The large surface area improves the loading characteristics of the fiber network 214. These loading characteristics facilitate load transfer and load distribution, which in effect resist structural changes, thereby maintaining the shapes 230 until sufficient and/or appropriate stimuli is applied, as discussed more below.

The vol. % of each of the matrix component 204 and the second component 208 can also characterize embodiments of the product 200. In one embodiment, the vol. % of the matrix component 204 is at least about 90% of the total volume of the product 200. In other embodiments, the vol. % of the matrix component 204 is from about 2% to about 10% of the total volume of the product 200. However, although the second component 208 makes up a small percentage (e.g., less than about 10%) of the total volume of the product 200, construction of the fiber(s) 216 and the resulting fiber network 214 provide sufficient loading characteristics to maintain the shapes 230 without hindering deformation or other properties of the product 200.

Referring to FIG. 3, in one example, the first temporary shape 232 is a deformation of the second temporary shape 234 and the second temporary shape 234 is a deformation of the permanent shape 236. Each of the shapes 230 may result from various deformative techniques such as twisting, folding, compressing, flattening, squeezing, and the like. In one embodiment, the desired configuration of the product 200 defines the resulting shapes that are programmed or trained. This configuration may be designed for a particular application of the product 200. Exemplary applications include, for example, use of the product 200 as a spring, locking mechanism, sliding actuator, and the like.

Depending on the intended use and application of, e.g., the multi-shape product 200, the stimuli to recover from the temporary shapes to the permanent shapes can be different or the same. Heating or thermal stimuli are examples of stimuli. However, other stimuli can be used including, but not limited to, electrical, light, and magnetic fields. When heated, heat can be applied continuously (or as "continuous heating"), thereby raising the temperature of the multi-shape product. In one example, the composition exhibits sequential recovery through the plurality of temporary shapes to the permanent shape in response to continuous heating, where recovery from each of the temporary shapes initiates at one or more points during heating. These points may define one or more transitions or changes in state of the materials, as discussed more below. In one example, the changes may initiate at certain temperatures, such as the melting temperature $T_m$ and/or the glass transition temperature $T_g$.

Embodiments of the product 200 may recover in consecutive or sequential steps, e.g., from the first temporary shape 232 to the second temporary shape 234 to the permanent shape 236. But in other embodiments direct switching between non-sequential shapes, e.g., from the first temporary shape 232 to the permanent shape 236, is also possible. This direct change can, in one example, maintain fixation of the subsequently "skipped" deformation or shape such as the second temporary shape 234.

Non-sequential and programmed recovery may result from the selection and application of particular stimuli. It is possible that the recovery can be tuned or programmed by way of different types or levels of stimuli to effectuate the non-sequential recovery. In one example, a first stimuli may be applied to change from the first temporary shape 232 to the permanent shape 236. This first stimuli may not, however, cause the second temporary shape 234 to be released or otherwise recover. On the other hand, a second stimuli may be applied to cause recovery from the second temporary shape 234 to the permanent shape 236.

Material selection for each of the first component 204 and the second component 208 may cause the resulting product 200 to react in different ways to the external stimuli. This reaction includes the sequential and non-sequential recovery discussed above. More particularly, recovery may vary in connection with state associated with the selected materials at, e.g., certain temperatures. Known states include glassy, liquid, rubbery, and semi-crystalline, each of which impart different mechanical properties to the product 200. Changes between these states occur at or near one or more transitions. The transitions are most often indentified by temperatures such as the melting temperature $T_m$ and the glass transition temperature $T_g$ of the materials that are used.

Tuning of the product 200 can achieve specific recovery properties. For example, understanding the properties of and selecting materials that will exhibit a certain states, including a first state and a second state, in response to (or when subject to) a particular applied stimuli (e.g., a heating curve). The changes may correspond or correlate to particular points or proximate particular points (e.g., a first point and/or a second point) on the heating curve. These points are, moreover, associated with the transition temperatures of the various materials that are found in or that comprise the first component 204 and the second component 206. For example, in one embodiment, at one point on the heating curve the first component 204 is rubbery and the second component 208 is semi-crystalline. In such a case, deformation in the product 200 and fixation of one or more temporary shapes may occur.

The Provisional Application describes various materials for each of the matrix component 204 and the fiber component 210. Generally the composition 202 comprises a shape memory material (e.g., the matrix component 104, 204) and a material (e.g., the fiber component 110, 210) conducive to, e.g., electro-spinning and/or related deposition technique to form fibers (e.g., the fiber component 110, 210). This combination promotes activation of the shape-memory and multi-shape properties as disclosed herein. As discussed below, the fibers are useful to maintain deformation in the product 200 when, for example, the shape memory material transitions to its rubbery state, the product is deformed, and subsequently cooled to solidify or vitrify the shape memory material.

As mentioned above, materials such as polymer and/or polymeric materials (hereinafter, "polymers") also include substances that comprise repeating molecular units. Further examples of materials for use as the first component (e.g., the first component 104, 204) can comprise, but are not limited to, covalently cross-linked amorphous polymers, covalently cross-linked semi-crystalline polymers, physically cross-linked polymers with amorphous switching phase, and physically cross-linked polymers with semi-crystalline switching phases. Further specific examples of materials of these types of polymers are discussed in more detail below. Additional details, examples, and embodiments of polymers for use as the shape memory component can likewise be found as discussed by Mather et al. in *Review of Progress Shape-memory Polymers*, J. Mater. Chem., 2007, 17, 1543-1558, which is incorporated herein by reference in its entirety.

Covalently cross-linked amorphous polymers (hereinafter "the Class I materials") can feature a sharp $T_g$ at the temperature of interest and rubber elasticity above $T_g$, which can be derived from covalent cross-links. One example of the Class I materials can be a chemically cross-linked vinylidene random copolymer consisting of two vinylidene monomers (one being methyl methacrylate and the other butyl methacrylate). Another example of the Class I material can be a chemically cross-linked polymer wherein $T_g$ that is greater than room temperature and with ultra-high molecular weight such as greater than $10^6$ g mol$^{-1}$. Yet another example of the Class I material can be polynorbornene ("PN"), compositions of which can have a $T_g$ of about 40° C. One particular example of PN is Norsorex® manufactured and sold by Zeon Chemicals Inc. of Louisville, Ky. Still another example of the Class I materials can be high molecular weight poly(methyl methacrylate) ("PMMA") which can have a $T_g$ of about 105° C. Still yet other examples of the Class I materials can comprise poly(alkyl methacrylate) copolymers; polystyrene copolymers; filler-modified epoxy networks; chemically cross-linked amorphous polyurethanes; poly((methyl methacrylate)-co-(N-vinyl-2-pyrrolidone))-PEG semi-IPNS; HDI-HPED-TEA networks; biodegradable copolyester-urethane networks; copolyester (e.g., with $T_g$ from about 48° C. to about 66° C.); P(AA-co-MMA)-PEG (e.g., with $T_g$ of about 60° C.); corn oil copolymer (e.g., with $T_g$ from about 0° C. to about 90° C.); PMMA-PBMA copolymers (e.g., with $T_g$ from about 20° C. to about 110° C.); epoxy (e.g., with $T_g$ from about 50° C. to about 80° C.); fish oil copolymers (e.g., with $T_g$ from about 30° C. to about 90° C.); PET-PEG copolymer (e.g., with $T_g$ up to about 80° C.), P(MA-co-MMA)-PEG (e.g., with $T_g$ from about 50° C. to about 90° C.); soybean oil copolymers with styrene and DVB (e.g., with $T_g$ from about 30° C. to about 110° C.), styrene copolymer; thermosetting PU (e.g., with $T_g$ from about 0° C. to about 150° C.); and, dehydrochlorinated cross-linked PVC (e.g., with $T_g$ of about 80° C.), as well as any combinations, derivations, and compositions thereof suited for use as the shape memory component of the self-healing products contemplated herein.

Covalently cross-linked semi-crystalline polymers (hereinafter, "the Class II materials") can feature characteristics of compliance below critical temperatures. Examples of the Class II materials can comprise bulk polymers such as semi-crystalline rubbers, liquid-crystal elastomers ("LCEs"), and hydrogels with phase separated crystalline microdomains. One example of the Class II materials can be chemically cross-linked trans-polyisoprene ("TIP"), compositions of which can have a $T_m$ of about 67° C., a degree of crystallinity around about 40%, and a stiffness of about 100 MPa at room temperature. Another example of the Class II materials can be chemically cross-linked semi-crystalline trans-polyoctenamer (polycyclo-octene) ("PCO"), compositions of which can have a trans content of about 80%, a $T_g$ of 70° C., and a $T_m$ of about 58° C. Yet other examples of the Class II materials can comprise poly-caprolactone (e.g., with $T_m$ from about 54° C. to about 58° C.); EVA+nitrile rubber (e.g., with $T_g$ of about 85° C.); PE (e.g., with $T_m$ of about 120° C.); polycyclo-octene (e.g., with $T_g$ of about 45° C.); PCO-CPE blends (e.g., with $T_m$ of about 58° C.); PCL-BA copolymer (e.g., with $T_g$ of about 45° C.); poly (ODVE)-co-BA (e.g., with $T_m$ of about 42° C.); EVA+CSM (e.g., with $T_m$ of about 80° C.), as well as any combinations, derivations, and compositions thereof suited for use as the shape memory component of the self-healing products contemplated herein.

Physically cross-linked polymers with amorphous switching phase (hereinafter, "the Class III materials") generally display rheological characteristics amenable to facile processing with conventional thermoplastic technology. One example of the Class III materials can be a melt-miscible blend of poly(vinyl acetate) ("PVAc") and poly(lactic acid) ("PLA"). Another example of the Class III material can be block copolymers and polyurethanes, compositions of which can be formed as a miscible blend of a thermoplastic polyurethane with phenoxy resin in which the soft segment of the polyurethane is PCL. Yet another example of the Class III materials can comprise norbornene that is copolymerized with polyhedral oligosilsesquioxane (norbornyl-POSS) hybrid monomer. Still other examples of the Class III materials can comprise miscible blends of PVAc with PLA and PVAc; miscible blends of PMMA with poly(vinyldiene fluoride) ("PVDF"); PLA-co-poly(glycolide-cocaprolactone); PLA-HA composites; low crystallinity, semi-crystalline homopolymers; POSS telechelic; PLAGC multiblock copolymer; aramid/PCL; PVDF/PVAc blends; poly(ketone-co-alcohol); PCL-b-ODX; PLA/PVAc blends; poly(1-hexadecene)-co-PP; PE-co-PMCP; POSS-PN block copolymer; PA-PCL; PET-co-PEO; PE-co-Nylon 6; PS-TPB, as well as any combinations, derivations, and compositions thereof suited for use as the shape memory component of the self-healing products contemplated herein.

Physically cross-linked polymers with semi-crystalline switching phases (hereinafter, "the Class IV materials") can be characterized by their soft domain crystallizing and, instead of $T_g$, the $T_m$ of these materials function as the shape-memory transition temperatures. One example of the Class IV materials can be a multi-block polyurethane featuring PEO as the soft segment. Another example of the Class IV materials can be styrene-trans-butadiene-styrene ("STBS") triblock copolymers. Yet another example of the Class IV materials can be thermoplastic segmented polyurethanes with semi-crystalline flexible segments. Still other examples of the Class IV materials can comprise POSS (e.g., with $T_g$ of about 45° C.); 4,4'-dihydroxybiphenyl ("DHBP") (e.g., with $T_g$ from about 50° C. to about 60° C.); 1,6-HD (e.g., with $T_g$ from about 40° C. to about 53° C.); 1,4-Butanediol (e.g., with $T_g$ from about 10° C. to about 50° C.); 1-4-Butane glycol, ethylene glycol bis(2-hyrdoxyethyl)hydroquinone, bisphenol A+ethylene oxide, bisphenol A+propylene oxide (e.g., with $T_m$ up to about 50° C.); 1,4-BD (e.g., with $T_m$ of about 25° C.); BEBP or BHBP (e.g., with $T_m$ from about 57° C. to about 63° C.); DHDP (e.g., with $T_m$ of about 40° C.); BD+DMPA (e.g., with $T_m$ of about 50° C.), as well as any combinations, derivations, and compositions thereof suited for use as the shape memory component of the self-healing products contemplated herein.

In one embodiment, polymers for use as the shape memory polymer can comprise shape memory polyurethanes ("SMPU") such as the photocurable polyurethane. These SMPUs can comprise SMPUs wherein optimized shape memory effects can be obtained at a hard-segment content of 35 to 40 wt % for glassy thermoplastic SMPUs. These shape memory effects can also be obtained in other SMPUs at a soft-segment molecular weight of 5000-6000 g mol$^{-1}$ for semi-crystalline SMPUs.

Other examples of SMPUs can also incorporate rigid aromatic structures and/or more planar molecules, which improve shape memory performances owing to stronger molecular interactions. Still other examples of SMPUs can comprise conductive inorganic fillers. These fillers can include aluminum nitride ("AlN") particle to improve the thermal conductivity, such as for example SMPUs with about 40 wt % loading. Other inorganic fillers can also comprise glass fibers, Kevlar fibers, SiC particles, and carbon nanotubes ("CNTs").

Examples of materials for use as the fiber component (e.g., the fiber component 110) can comprise semi-crystalline and amorphous polymers that have a thermal transition that mobilizes the polymer to a fluid state. In one embodiment, these polymers can be selected so that the transition temperature at this thermal transition are within ±50° C. of the shape memory recovery temperature of the shape memory component, with various examples of multi-shape products having polymers with transition temperatures within at least one of ±5° C., ±10° C., and ±25° C. of the shape memory recovery temperature. Examples of polymers that can be used can comprise polyacrylates, polymethacrylates, polyesters, among as well as any combinations, derivations, and compositions thereof suited for use as the shape memory component of the products contemplated herein.

Referring next to FIGS. 4-7, attention now turns to techniques to manufacture embodiments of multi-shape products. These techniques manipulate materials to form the composition 102 that permits the resulting products to exhibit multi-shape properties. Many of the concepts discussed below are broadly applicable to any one of the materials above. However, specific parameters, e.g., temperature and time, may vary to accommodate the exact selection and combination of materials.

Figure 4:
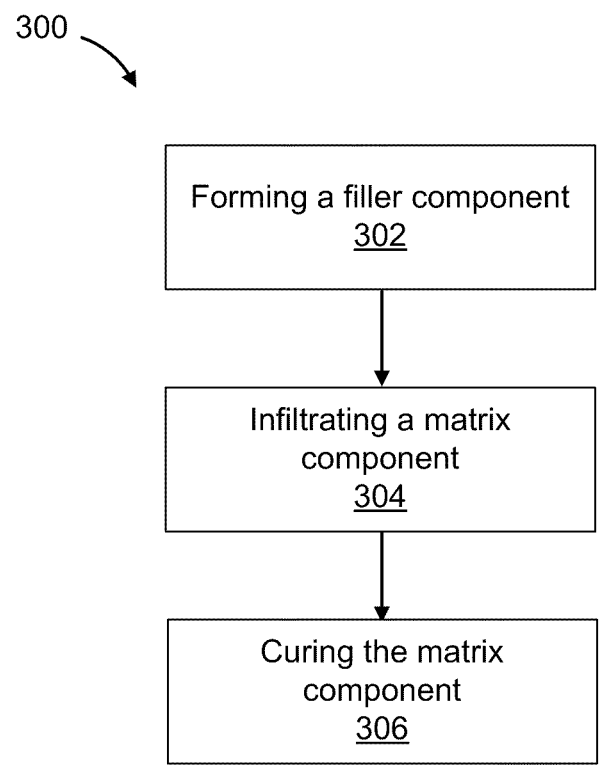
FIG. 4 is a flow diagram of an exemplary method of manufacturing embodiments of multi-shape products such as the multi-shape products of FIGS. 1-3.
Figure 5:
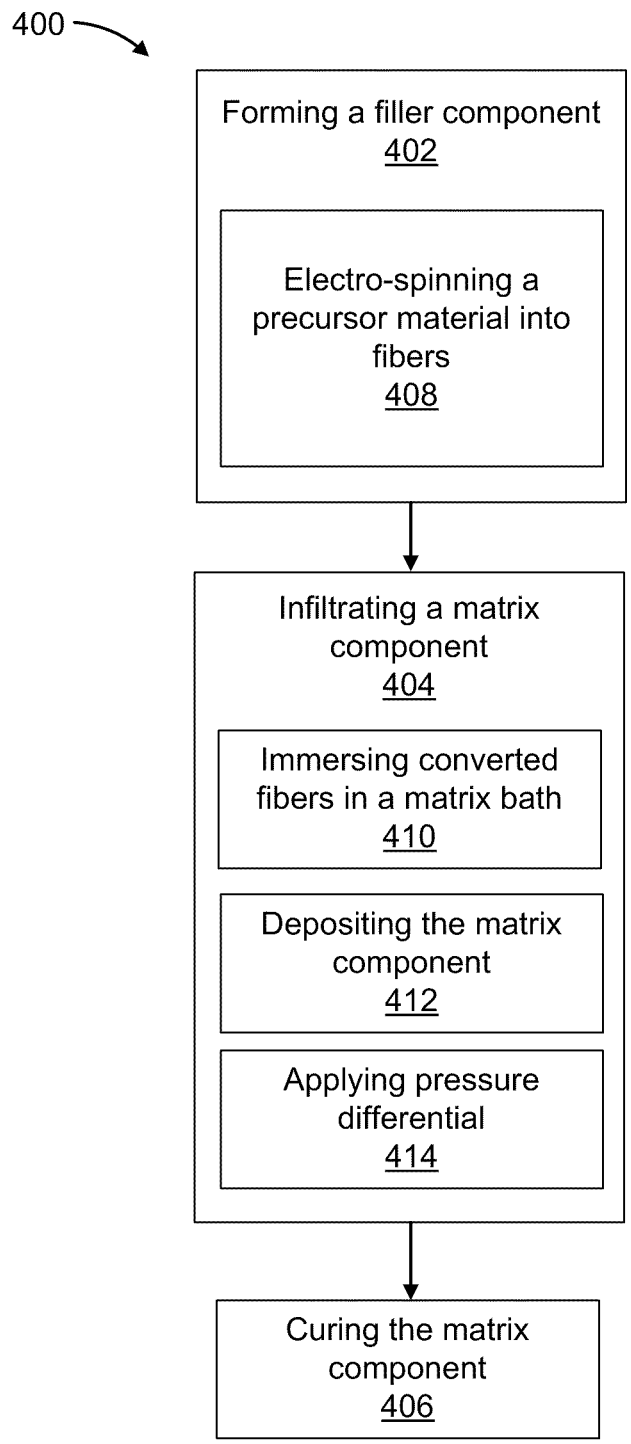
FIG. 5 is a flow diagram of another exemplary method of manufacturing embodiments of multi-shape products such as the multi-shape products of FIGS. 1-3.

FIGS. 4 and 5 illustrate an "inside-out" approach to construct embodiments of the multi-shape products 100 (FIG. 1) and 200 (FIG. 2). That is, this approach causes the matrix component 204 to infiltrate the fiber network (e.g., the fiber network 114, 214) after the fiber(s) (e.g., the fiber(s) 214, 216) are formed. Method 300 (FIG. 4) and method 400 (FIG. 5) embody at least two examples of this approach. The method 300 comprises, at block 302, forming the fiber component, at block 304, infiltrating a matrix component into the fiber component and, at block 306, curing the matrix component.

Forming the fiber component (e.g., at block 302) can utilize a variety of manufacturing techniques. These techniques achieve the features of the fiber network (e.g., the fiber network 114, 214). Electro-deposition processes are compatible with these goals. For example, electro-spinning processes generate nano-scale fibers and, more particularly, fibers with dimensions and features of the fibers (e.g., the fibers 116, 216) discussed above. In one example, the electro-spinning processes create the fiber network as a single, continuous, nonwoven fiber out of one or more precursor materials (e.g., PCL). Folding, overlapping, and dispersal of the nonwoven fiber causes the nodes (e.g., the nodes 118, 218) to be randomly and intermittently dispersed throughout the fiber network.

In one example, the method forms the fiber network before the matrix component is introduced such as by electro-spinning the precursor material as a fiber mat onto a substrate. Infiltration (e.g., at block 304) thereafter occurs by depositing the matrix component onto the fiber mat. The matrix component penetrates or wicks into the interstitial voids (e.g., the interstitial voids 220). This process can be passive, i.e., the properties of materials used for the matrix component and/or the fiber component permit sufficient wetting to allow the matrix component to enter the interstitial voids. Other examples employ active infiltration such as by using positive and/or negative pressure differences to facilitate wicking and movement of the matrix component into the interstitial voids.

Properties of the materials, e.g., the matrix component, may require that the resulting product is cured (e.g., at block 306). Curing solidifies the matrix component such as by facilitating cross-linking or similar changes in the structure (e.g., the chemical structure) of the materials. In other example, curing is not required or is replaced by one or more post-processing steps such as annealing or other steps that fix the various shapes (e.g., the shapes 230) as discussed more below.

In FIG. 5, the method 400 includes, at block 402, forming a fiber component, at block 404, infiltrating a matrix component and, at block 406, curing the matrix component. The method 400 further comprises, at block 408, electro-spinning a precursor material into fibers (e.g., the fiber component 110, 210) such as into a fiber mat. An example of the precursor material is PCL. In one embodiment, the method 400 includes, at block 410, immersing the fibers in a matrix bath, which can include in one example resin or related composition that embodies the matrix component (e.g., the matrix component 104, 204). Alternatively or in addition, the method 400 comprises, at block 412, depositing the matrix component such as by appropriate deposition techniques. These techniques may deploy a syringe and/or knife blade to provide the matrix component in sufficient quantities and thickness as related to the embodiments contemplated herein. The method 400 can also comprise, at block 414, applying a pressure differential such as placing the fiber/matrix composition under positive and/or negative pressure (e.g., vacuum).

Figure 6:
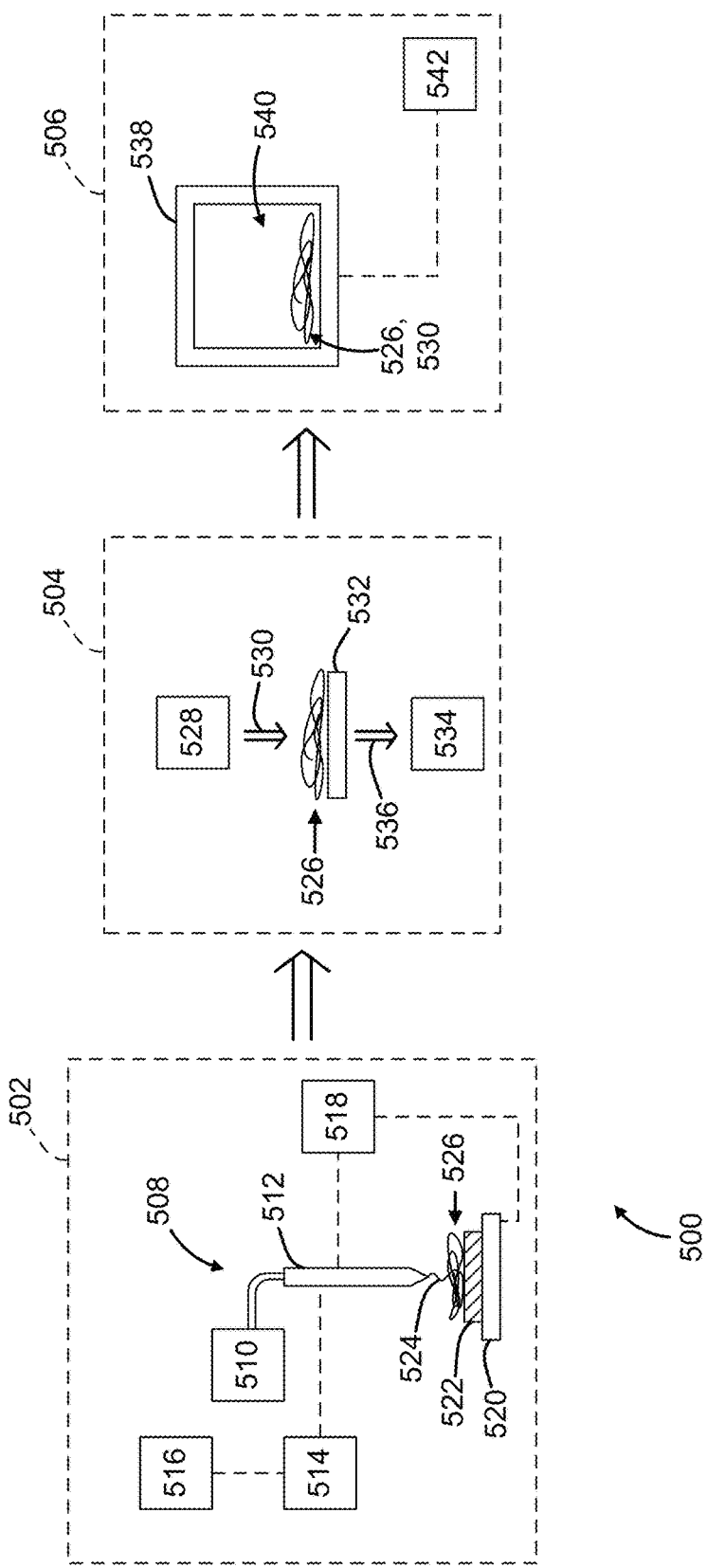
FIG. 6 is a schematic diagram of a manufacturing system to manufacture embodiments of multi-shape products such as the multi-shape products of FIGS. 1-3.

FIG. 6 shows a manufacturing system 500 that implements the methods 300 and 400 and related embodiments. The manufacturing system 500 creates the composition, providing in a generic embodiment certain elements that form the fibers, that integrate the matrix component, and that cure and/or solidify the resulting composition. The inventors recognize that those artisans skilled in the relative deposition and polymer sciences will understand the more detailed concepts of the elements, therefore details are not necessary but for details found in the Experimental Results and Experimental Implementation below. Moreover, the manufacturing system 500 may implement additional elements (although not shown) to achieve various levels of process control and sophistication, with the end results, i.e., embodiments of the product 100, 200 and/or the composition 102, 202. Each will exhibit features that fall within the various parameters set forth above and contemplated within the scope and spirit of the present disclosure and the Provisional Application.

The manufacturing system 500 comprises an electro-spinning apparatus 502, a matrix deposition apparatus 504, and a curing apparatus 506. The electro-spinning apparatus 502 comprises a spinning unit 508, in which there is incorporated a micro-pump 510, a syringe 512, and a heater 514. The electro-spinning apparatus 502 also comprises a temperature controller 516, which is coupled to the heater 514, and a power supply 518 that is coupled to the syringe 512 so as to cause a voltage at the tip of the syringe 512. A collector 520 such as a grounded metallic plate or metallic roller is also provided. The collector 520 supports a substrate 522, on which is deposited a precursor material 524 in the form of the fiber(s) (e.g., the fiber(s) 116, 216) disclosed and described herein. In one embodiment, and for purposes of the present discussion, the fiber(s) form a fiber mat 526.

The matrix deposition apparatus 504 comprises an applicator 528, such as a syringe and/or knife blade that is configured to introduce a matrix material 530 onto the fiber mat 526. A support 532 is located below the applicator 528 in a position to support the fiber mat 526 and/or the substrate 522. In one embodiment, the matrix deposition apparatus 504 is equipped with a vacuum element 534, which is configured to apply vacuum 536 to facilitate penetration of the matrix material 530 into the fiber mat 526. Alternative configurations of the vacuum element 534 include utilizing a vacuum chamber or similarly situated device in which the fiber mat 526 and the matrix material 530 are submersed in the vacuum environment.

The curing apparatus 506 comprises a heating/cooling device 538 with a cavity 540 and a temperature control unit 542. The cavity 540 is large enough to accommodate at least a portion of the fiber mat 526, which is since interpenetrated with the matrix material 530. The temperature control unit 542 regulates the temperature inside of the cavity 540, thereby causing to solidify the matrix material 530.

Individualized units that embody the electro-spinning apparatus 502, the matrix deposition apparatus 504, and the curing apparatus 506 may be implemented in laboratory or small-scale manufacturing setting. However, scale-up production may require automated features. For example, although not shown as part of the manufacturing system 500, various ancillary devices such as motors, gears, belts, conveyors, robots, and control devices may be useful or necessary to integrate the various apparatus and systems identified in FIG. 6 and contemplated herein. Moreover, additional elements may also be implemented as part of the manufacturing system 500 to affix or otherwise "train" the various shapes (e.g., the fixed shape and the stimulated shape) of the product 200.

Figure 7:
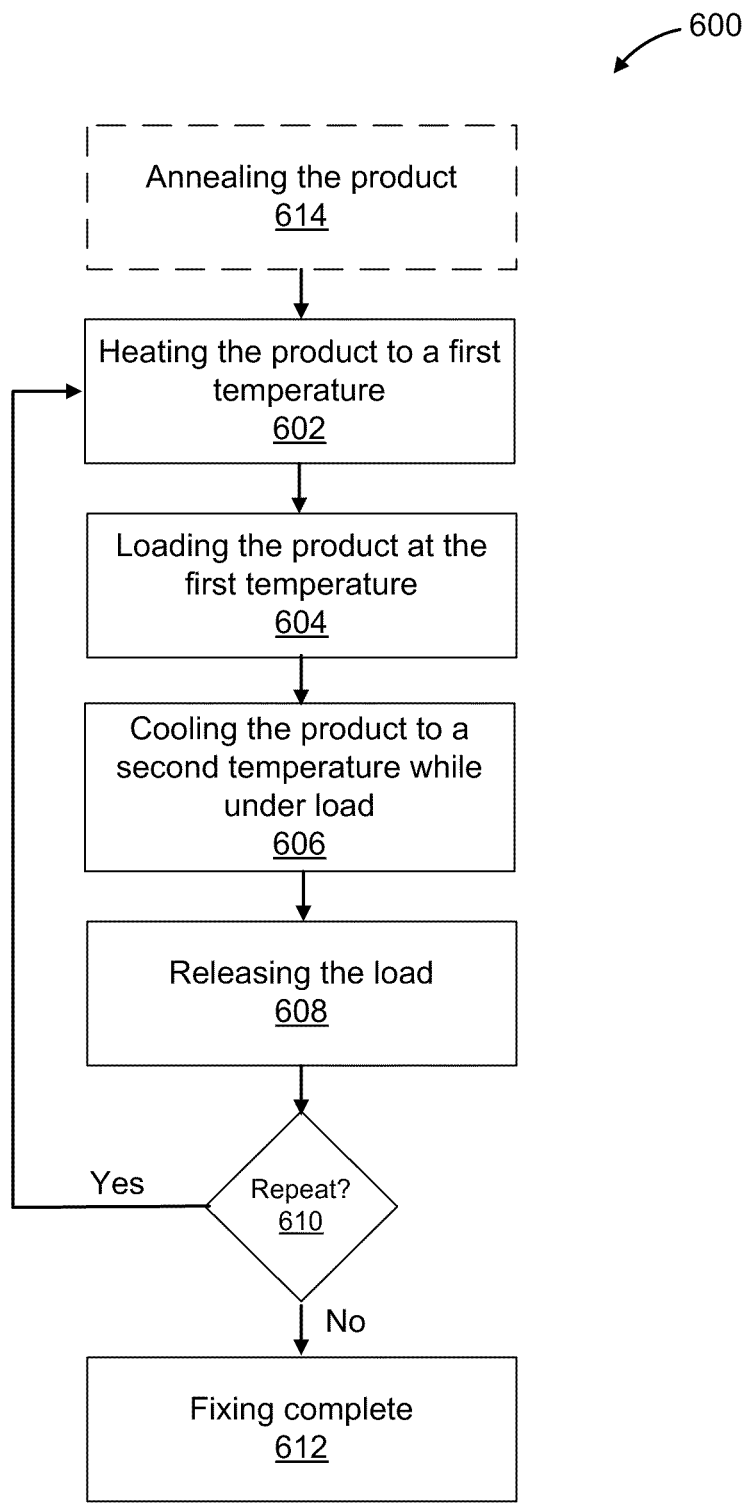
FIG. 7 is a flow diagram of an exemplary method of fixing embodiments of multi-shape products such as the multi-shape products of FIGS. 1-3.

In this connection, FIG. 7 illustrates an exemplary method 600 for fixing, programming, and/or training the various shapes (e.g., the shapes 230 (FIG. 2)) of the multi-shape products of the present disclosure. At a relatively high level, these methods manipulate the states of the materials to affix the product in one or more of shapes. This manipulation may rely, in part, on changes in temperature in conjunction with various schemes to apply loads and stresses to the product. The temperature changes cause the matrix component and the fibers to transition between states, e.g., from glassy to rubbery, thereby becoming more compliant (or exhibiting "a compliant state") so as to be easily shaped under the applied load. Other changes, e.g., rubbery to glassy, reduce the compliance of the material, which affixes the resulting product into one or more shapes.

In one embodiment, the fixing method 600 comprises, at block 602, heating the product to a first temperature, at block 604, loading the product at the first temperature and, at block 606, cooling the product to a second temperature while under load. The method 600 can also comprise, at block 608, releasing the load and, in one example, at block 610, determining if another shape is to be fixed. If another shape is required, then the method 600 returns to block 602 and the process steps repeated. When additional changes to the shape are not required, then fixing is complete, as indicated at block 612. Moreover, in one embodiment, the method 600 comprises, at block 614, annealing the product before loading and deformation begins.

Selection of the parameters for heating and cooling, as well as suitable loading characteristics, will depend on many factors. The Experimental Results discuss details of certain fixing methods. These details include heating and cooling temperatures, heating and cooling times, heating and cooling rates, and loading characteristics to achieve certain, particular shaping in connection with particular combination of materials.

(3) EXPERIMENTAL RESULTS

FIGS. 8-20 depict the Appendix C-N of the Provisional Application, which discusses additional details of multi-shape products (e.g., the products 100, 200 above). The discussion below recites these details in the form of various examples, including Examples 1-6 found in the EXPERIMENTAL SECTION and EXPERIMENTAL IMPLEMENTATION of the Provisional Application.

These examples illustrate features embodied by the products (e.g., the products 100, 200) and their various derivatives. Material selection, process parameters, and relevant methodology that these examples highlight do not restrict or limit the scope of the present disclosure. Nor do any dimensions, shapes, and other features in these examples. Rather the details are exemplary only and should not be used to limit any of the embodiments of the invention. The inventors contemplate that variations depend on the practice and implementation of the concepts discussed herein as well as variety of factors such as, but not limited to, the size, shape, and dimensions of the product, the materials of construction, the application and/or implementation of the product, and the like.

The examples describe products that exhibit multi-shape recovery. This disclosure also refers to such recovery as "triple-shape" recovery and, in connection with the products themselves, as "triple-shape polymeric composites ("TSPCs")." The terms triple-shape and TSPCs are consistent with those products that exhibit at least three shapes (e.g., one permanent shape and two temporary shapes). Of course, other embodiments can exhibit more or less than three shapes and, therefore, the number of shapes does not itself characterize multi-shape products. Rather the subject matter of the present disclosure instructs of products that have a plurality of temporary and/or fixable shapes, with the examples below focusing on products with two temporary shapes and one permanent shape.

Figure 8:
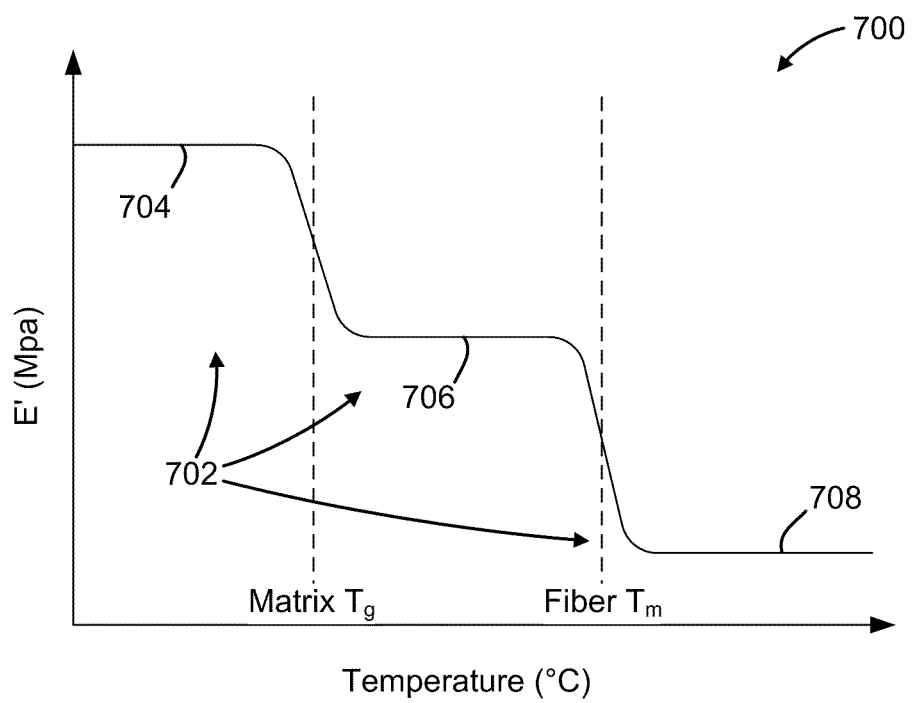
FIG. 8 depicts a plot of temperature-dependent dynamic mechanical behavior of an embodiment of a multi-shape product.

FIG. 8 (Appendix C) is a schematic illustration of temperature-dependent dynamic mechanical behavior of an exemplary embodiment of a multi-shape product (e.g., the products 100, 200). FIG. 8 illustrates this behavior as a plot 700. In the present example, the plot 700 has a number of plateaus 702, including a first plateau 704, a second plateau 706, and a third plateau 708. Each of the plateaus 702 defines a phase or state for the components of the shape memory products, and, more particularly, for the matrix component (e.g., the matrix component 104, 204) and the fiber component (e.g., the fiber component 110, 210).

Table 1 below describes the phases at the plateaus 702 for one embodiment of the products described herein.

TABLE 1

| Plateau | Matrix Component | Fiber Component |
|---|---|---|
| First | Glassy | Semi-crystalline |
| Second | Rubbery | Semi-crystalline |
| Third | Rubbery | Liquid-like |

Deformations (i.e., the induced reductions in conformational entropies) within the two rubbery plateaus (T>Fiber $T_m$ and Matrix $T_g$,<T<Fiber $T_m$) can be individually fixed by fiber crystallization and matrix vitrification, respectively. Comparing with previously reported triple-shape SMPs, embodiments of the multi-shape products provide a much larger degree of design flexibility because properties of these products can be modified such as by separately tuning the two functional components (e.g., the matrix component and the fiber component) to achieve optimum control of these properties. In addition, the multi-shape product can be built upon commercially available polymers with a simple fabrication method, which ensures its cost-effectiveness and potential for large-scale manufacturing.

Experimental examples follow in which is described the preparation and detailed characterization of certain embodiments of the multi-shape product exhibiting properties of the triple-shape polymeric composites. These examples illustrate, in accordance with concepts of the present invention, certain characteristics of embodiments of multi-shape products such as high performance and unique functionality.

The following non-limiting examples have been carried out to illustrate one or more embodiments of a multi-shape product made in accordance with the concepts of the present invention.

Example 1

Figure 9:
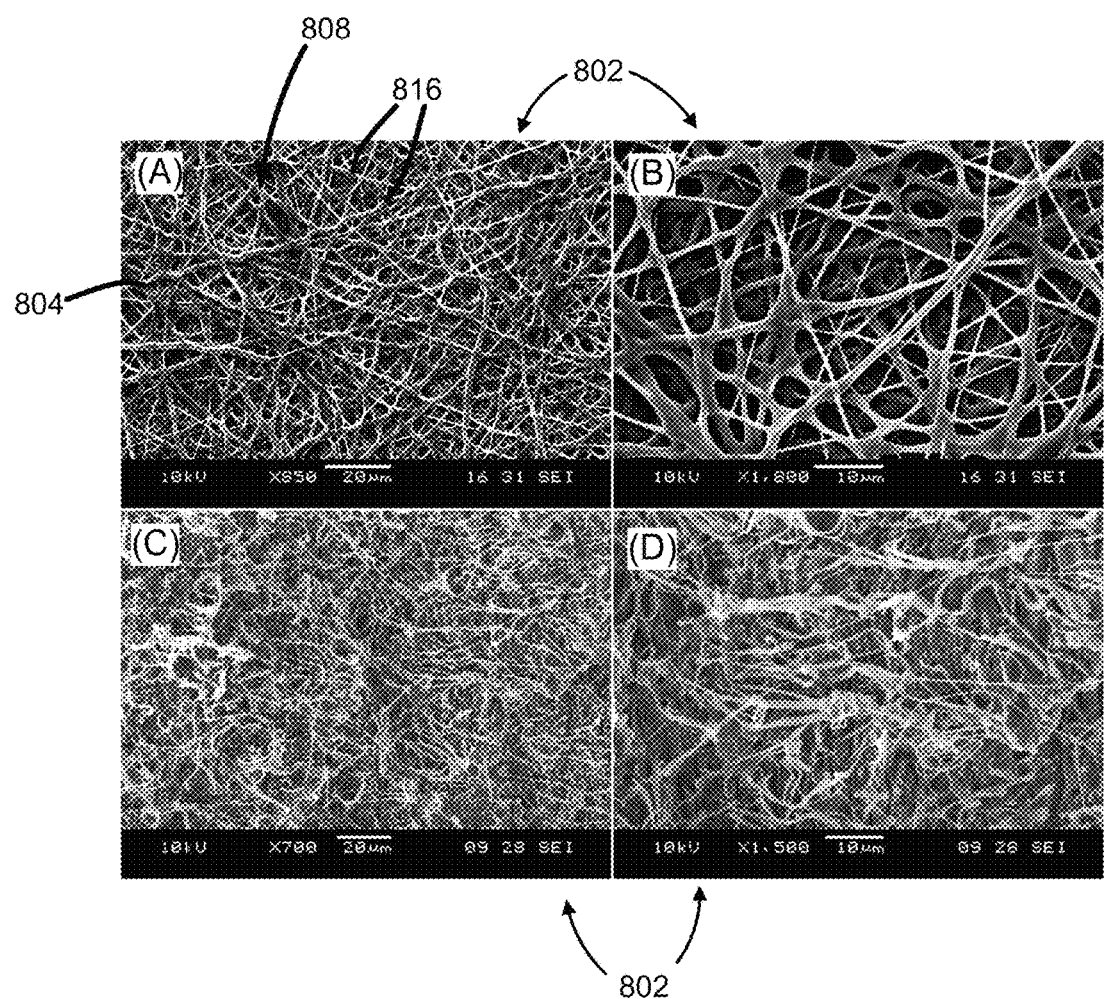
FIG. 9 depicts micrographs of an embodiment of a multi-shape product.

FIG. 9 (Appendix D) depicts a series of micrographs taken by a scanning electron microscope ("SEM") of a multi-shape product 800. The product 800 comprises a composition 802 with a matrix component 804 of Epoxy and a fiber component 808 with fibers 816 comprising PCL fibers. In FIG. 9, images (A) and (B) show the as-spun PCL fibers (e.g., the fiber component 808). Images (C) and (D) show a cryogenically fractured surface of the product 800.

Figure 10:
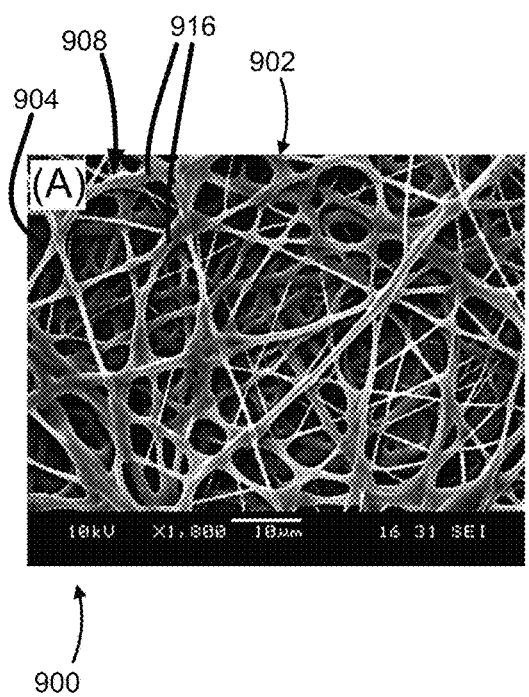
FIG. 10 depicts micrographs of an embodiment of a multi-shape product.
Figure 11:
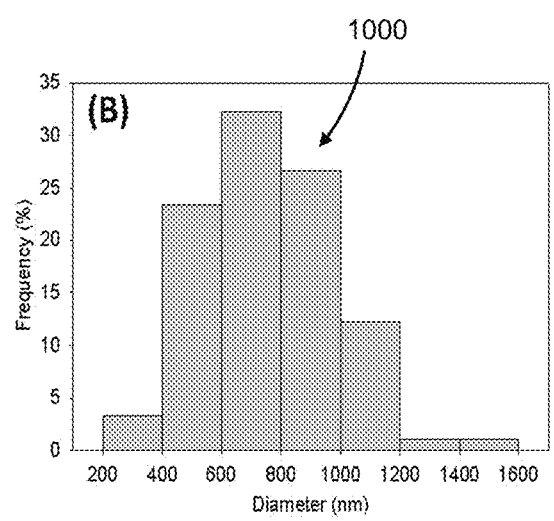
FIG. 11 depicts a histogram of data collected from diameter analysis of an embodiment of a multi-shape product.

FIG. 10 (Appendix L) depicts a micrograph taken by an SEM of a multi-shape product 900 (FIG. 10) that comprises a composition 902 with a matrix component 904 (e.g., Epoxy) and a fiber component 908 with fibers 916 (e.g., PCL fibers). FIG. 11 (Appendix L) depicts a histogram 1000 of data from diameter analysis for the fibers 916 (FIG. 10). A total number of 90 fibers were randomly and evenly picked from the SEM image of FIG. 10. The diameters were measured using ImageJ software. The histogram 1000 visualizes the distribution of the diameters. In the present example, the number-average fiber diameter (or "average diameter") was calculated to be 760 nm with a standard deviation of 220 nm.

To fabricate embodiments of the multi-shape product (e.g., the products 800, 900) comprising TSPCs, and more particularly TSPCs with the target non-woven fiber/matrix morphology, PCL was first electro-spun into non-woven fibers with an average diameter of 760±220 nm (obtained from image analysis as show in FIG. 11 and mentioned above). Examples of this morphology are shown in FIGS. 9 and 10. In these examples, an epoxy-based copolymer thermoset system reported by Xie and Rousseau was chosen for the matrix component 804, 904 (See reference 19 below). This system can be chemically composed of an aromatic diepoxide (diglycidyl ether of bisphenol-A or DGEBA), an aliphatic diepoxide (neopentyl glycol diglycidyl ether or NGDE), and a diamine curing agent (poly (propylene glycol)bis(2-aminopropyl) or Jeffamine D230).

Examples of the chemical structures of these materials are shown below:

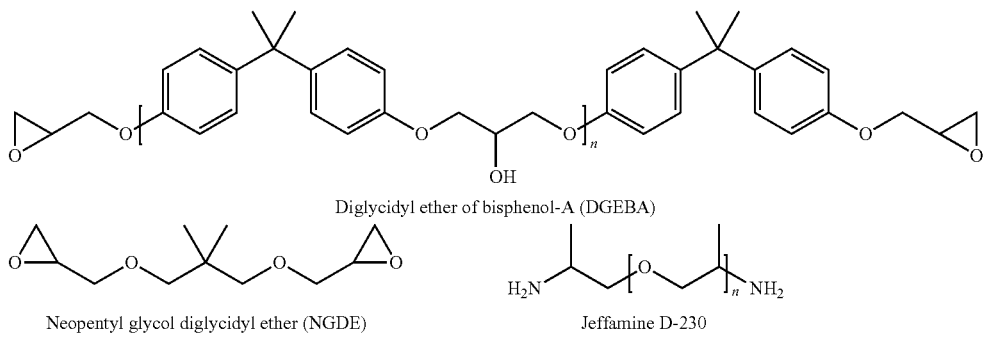

Diglycidyl ether of bisphenol-A (DGEBA)

Neopentyl glycol diglycidyl ether (NGDE)

Jeffamine D-230

Besides the fine control of the glass transition temperature $T_g$ by copolymerizing DGEBA and NGDE at different ratios, examples of the products 800, 900 feature additional advantages of excellent cycle life-time and good thermal/chemical stability. The fabrication of TSPCs was guided by previously established protocols (See references 18 and 20 below).

In one example, a piece of PCL fiber mat (e.g., the fiber mat 526 of FIG. 6) was first immersed into a liquid resin mixture, which could easily wet (such as by capillary action or similar wicking action) the PCL fiber mat due to its low starting viscosity coupled with favorable interfacial energetics. After carefully removing the excess resin present on the surfaces with a spatula, the product was cured at 40° C. for >72 h. The bulk structure of fully cured TSPCs is illustrated in FIGS. 9 and 10, which show imaging of a cryogenically fractured sample surface of the product 800, 900. There is shown in these illustrations a non-woven, interpenetrating fiber/matrix morphology. The average PCL wt-% was measured gravimetrically to be 17.5%±0.1%.

Example 2

Figure 12:
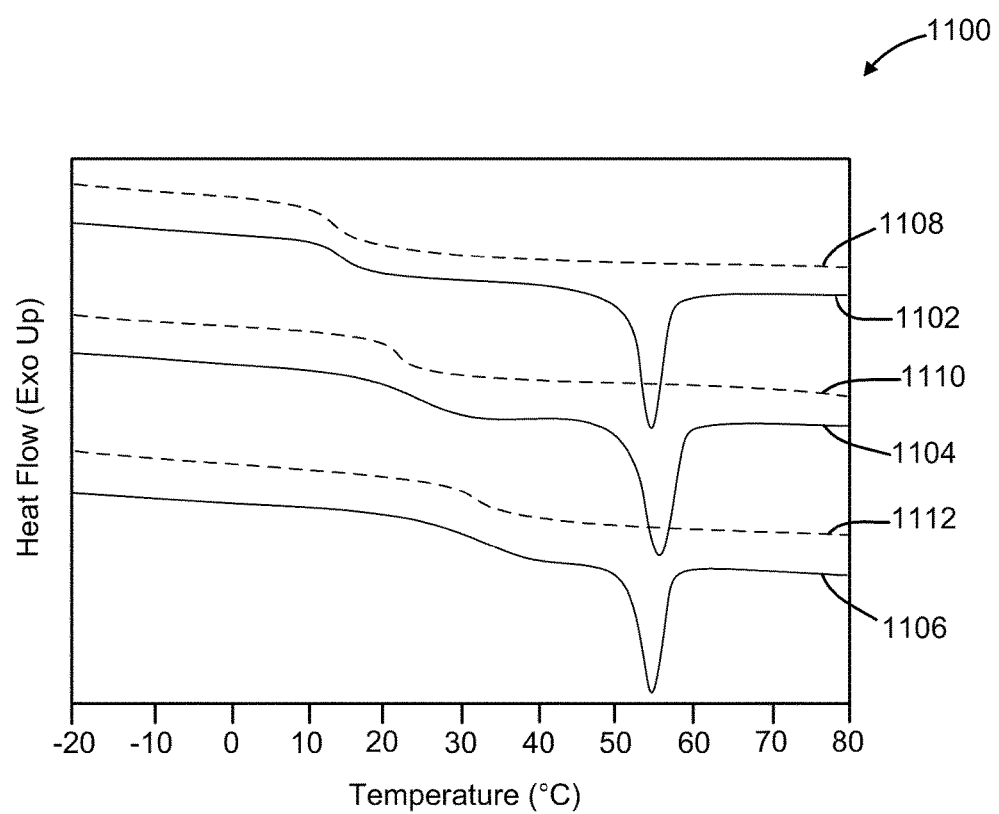
FIG. 12 depicts data collected from differential scanning calorimetry thermograms of an embodiment of a multi-shape product.

FIG. 12 (Appendix F) depicts data from dynamic mechanical calorimetry ("DSC") thermograms (second heating) of exemplary embodiments of a multi-shape product (e.g., the products 100, 200, 800, and 900). FIG. 12 illustrates a series of plots 1100 that comprise plots for various TSPCs including a first product 1102 (comprising D20N80/PCL), a second product 1104 (comprising D30N70/PCL), and a third product 1106 (comprising D40N60/PCL). For comparison, the plots 1100 also comprise plots for non-TSPC products, which do not include the fiber component. Rather these "neat" products comprise only the matrix component. More particularly, the plots 1100 comprise plots for a first neat product 1108 (comprising D20N80), a second neat product 1110 (comprising D30N70), and a third neat product 1112 (comprising D40N60).

The thermal transitions of certain TSPCs, useful in embodiments of the products contemplated herein, can have properties identified using differential scanning calorimetry (DSC) with the second heating thermograms shown in FIG. 12. The exemplary materials are named according to their compositions, where D and N stand for DGEBA and NGDE, respectively. The number after each letter (D or N) represents the mol-% of the component. The curing agent Jeffamine D230 was incorporated in each exemplary material with stoichiometric equivalence (equal number of epoxide rings and amine protons) and is neglected in the sample nomenclature.

It can be observed from FIG. 12 that all TSPCs (e.g., the first product 1102, the second product 1104, and the third product 1106) show two well-separated thermal transitions, with the step transition at the lower temperature and the peak at the higher temperature attributed to the glass transition of epoxy and the melting of PCL, respectively. The epoxy $T_g$ increased as more DGEBA (the aromatic diepoxide) was used, while PCL $T_m$ remained relatively unchanged and independent of epoxy composition. Furthermore, the epoxy $T_g$'s of TSPCs are almost the same as neat epoxy samples (e.g., the first neat product 1108, the second neat product 1110, the third neat product 1112) of the same compositions (dashed lines). These findings indicate that there was no or little mixing between epoxy and PCL, and that the two phases (e.g., the matrix component and the fiber component) can behave quite independently. This is advantageous since it allows the control of overall properties of the composite by separately tuning each of the components.

Example 3

Figure 13:
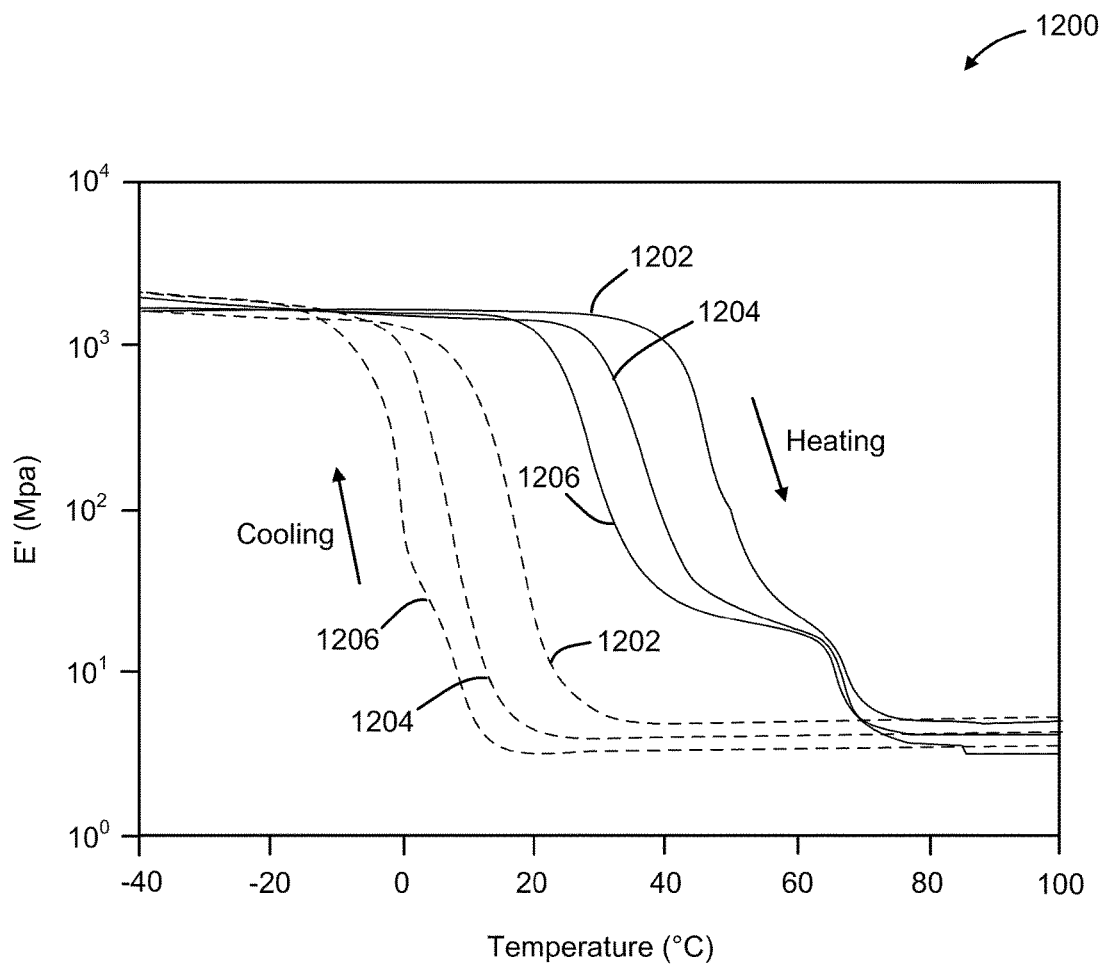
FIG. 13 depicts data collected from dynamic mechanical analysis of an embodiment of a multi-shape product.

FIG. 13 (Appendix G) is a plot of data from dynamic mechanical analysis ("DMA") results for embodiments of a multi-shape product (e.g., the products 100, 200, 800, 900). The embodiments comprise Epoxy/PCL TSPCs and undergo both heating (solid lines) and cooling (dashed lines). The heating and cooling rates were both 3° C./min. More particularly, FIG. 13 illustrates a series of plots 1200 that comprise plots for a first product 1202 (comprising D20N80/PCL), a second product 1204 (comprising D30N70/PCL), and a third product 1206 (comprising D40N60/PCL).

The temperature-dependent dynamic mechanical behavior is also important for the multi-shape products since it is predictive of the shape memory properties and provides information for designing thermo-mechanical programs for shape fixing and recovery (See reference 2 below). For this purpose, dynamic mechanical analysis (DMA) was performed for exemplary multi-shape products such as the TSPCs under both heating and cooling. Properties of these exemplary multi-shape products are illustrated in FIG. 13. In good accordance with DSC results in Example 2 and FIG. 12, all heating traces (solid lines) showed two separate thermal transitions corresponding in this example to epoxy $T_g$ and PCL $T_m$, respectively. As a result, two rubbery plateaus, one lying approximately between epoxy $T_g$ and PCL $T_m$ and the other existing approximately above PCL $T_m$, were observed.

In the present examples, the epoxy $T_g$ showed dependence on DGEBA content, while PCL melting occurs at almost the same temperature for all three compositions. Table 2 summarizes the thermal properties of TSPCs determined by both DSC ($2^{nd}$ heating) and DMA (heating). The transition temperatures determined by DMA are noticed to be higher than those determined by DSC in Example 2 and FIG. 12, a finding commonly observed for the glass transition and consistent with the observations by Xie and Rousseau on the neat epoxy systems (See Reference 19 below).

TABLE 2

| Sample | Epoxy $T_g$ from DMC (° C.) | PCL $T_m$ from DSC (° C.) | PCL $H_m$ (J/g) | Epoxy $T_g$ from DMA (° C.) | PCL $T_m$ from DMA (° C.) |
| --- | --- | --- | --- | --- | --- |
| D20N80/PCL | 15.28 | 54.75 | 9.69 | 23.01 | 65.17 |
| D30N70/PCL | 23.95 | 55.97 | 10.40 | 30.48 | 64.41 |
| D40N60/PCL | 33.24 | 54.47 | 9.65 | 41.37 | 66.17 |

The cooling DMA results (dashed lines in FIG. 13) reveal quite different features from the heating traces. In the present example, except for D20N80/PCL in which the two step transitions can still be identified, in D30N70/PCL and D40N60/PCL the two transitions (e.g., epoxy vitrification and PCL crystallization) are largely merged together into a single step. This feature is primarily due to the difference in kinetics between the two transitions (crystallization being slower) under the same cooling rate (3° C./min). This similarity imposes some challenges to shape fixing, such as, for example, since two separated transitions may be needed to fix two different temporary shapes. Therefore specifically designed thermo-mechanical programs, rather than simple deformation-cooling steps, may be needed for some embodiments of the products comprising TSPCs.

Example 4

Examples of three different fixing methods are discussed and analyzed in accordance with the resulting multi-shape products comprising TSPCs. More particular to the discussion below, an example of D30N70/PCL is used to demonstrate triple-shape behavior. Of course, the principles involved in all fixing methods are equally applicable to other compositions, derivations, and embodiments of multi-shape products including those multi-shape products comprising TSPCs disclosed and contemplated herein.

Figure 14:
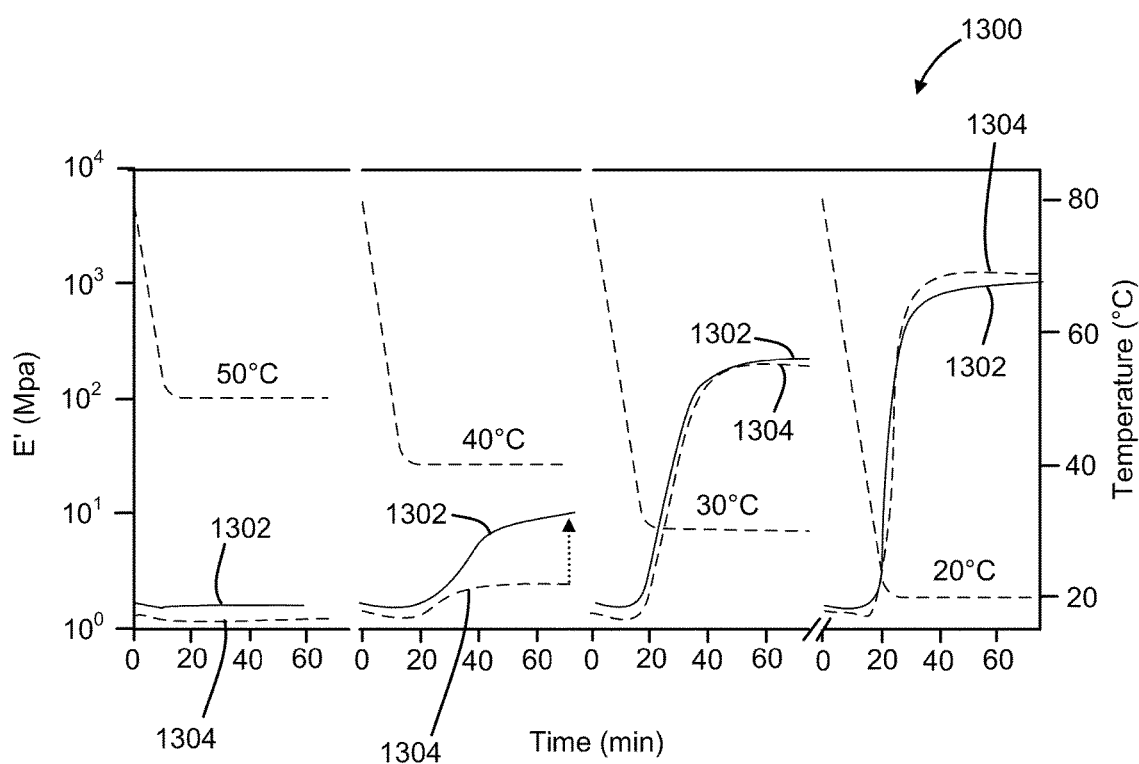
FIG. 14 depicts data collected from dynamic mechanical analysis of an embodiment of a multi-shape product.

FIG. 14 (Appendix H) is a plot of Isothermal DMA results for an embodiment of a multi-shape product (e.g., the products 100, 200, 800, and 900). FIG. 14 illustrates a series of plots 1300 that includes a plot for a product 1302 that comprises D30N70/PCL and, in comparison, a plot for a neat product 1304 that comprises D30N70. The data represents different temperatures of 50° C., 40° C., 30° C. and 20° C. In each case, the sample was first equilibrated at 80° C., cooled to the target isothermal temperature at 3° C./min and held isothermally for 60 min. The dashed arrow indicates the contribution from PCL crystallization.

In one example, the fixing method involved an isothermal annealing step at an intermediate temperature to induce PCL crystallization while maintaining the epoxy matrix in the rubbery state. Isothermal DMA was performed to isolate an annealing temperature useful for strain fixing. For this example, the samples (e.g., the product 1302 and the neat product 1304) (in this case a rectangular film under oscillatory tension) was equilibrated at 80° C., cooled to an intermediate temperature at 3° C./min, and held isothermally for 60 min.

Four isothermal temperatures of 50° C., 40° C., 30° C. and 20° C. were investigated with the corresponding time-dependent storage modulus (E') profiles shown in FIG. 14 for both D30N70/PCL (the product 1302) and D30N70 (the neat product 1304, in this case an example of a neat epoxy). Observations indicate that 50° C. was too high for both transitions, given the flatness of E' over time. However, at 40° C., the storage modulus of D30N70/PCL showed an increase that significantly exceeded D30N70. This can result from the isothermal crystallization of PCL, since the presence of PCL is the only structural difference between the two materials. When the temperature was further decreased to 30 and 20° C., both transitions took place in a time-overlapping fashion and the two samples showed similar storage modulus time evolutions. In one embodiment, 40° C. is one temperature (among those studied) for first-stage shape fixing by PCL crystallization without epoxy matrix vitrification.

Figure 15:
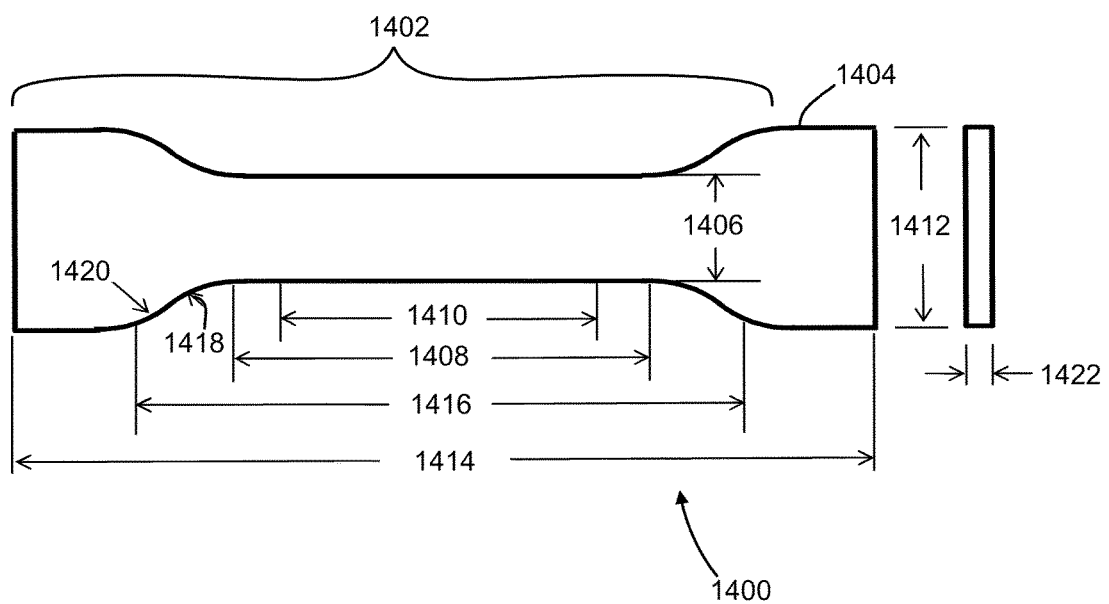
FIG. 15 depicts a product geometry for characterization of an embodiment of a multi-shape product.

FIG. 15 (Appendix M) illustrates another exemplary embodiment of a multi-shape product 1400 that has a dumbbell geometry 1402 for bulk shape memory characterization. The dumbbell geometry 1402 has a form factor 1404 described by the following dimensions: a width of narrow section 1406, a length of narrow section 1408, a gage length 1410, a width overall 1412, a length overall 1414, a distance between grips 1416, a radius of fillet 1418, an outer radius 1420, and a thickness 1422.

Table 3 summarizes the dimensions for one embodiment of the product 1400. Example 4 uses this embodiment for analysis and explanation that follows below of the various fixing methods.

TABLE 3

| Dimension | Value (mm) |
| --- | --- |
| W (1406) | 1.50 |
| L (1408) | 8.25 |
| G (1410) | 6.25 |
| WO (1412) | 4.75 |
| LO (1414) | 28.75 |
| D (1416) | 16.25 |
| R (1418) | 3.50 |
| RO (1420) | 6.25 |

Figure 16:
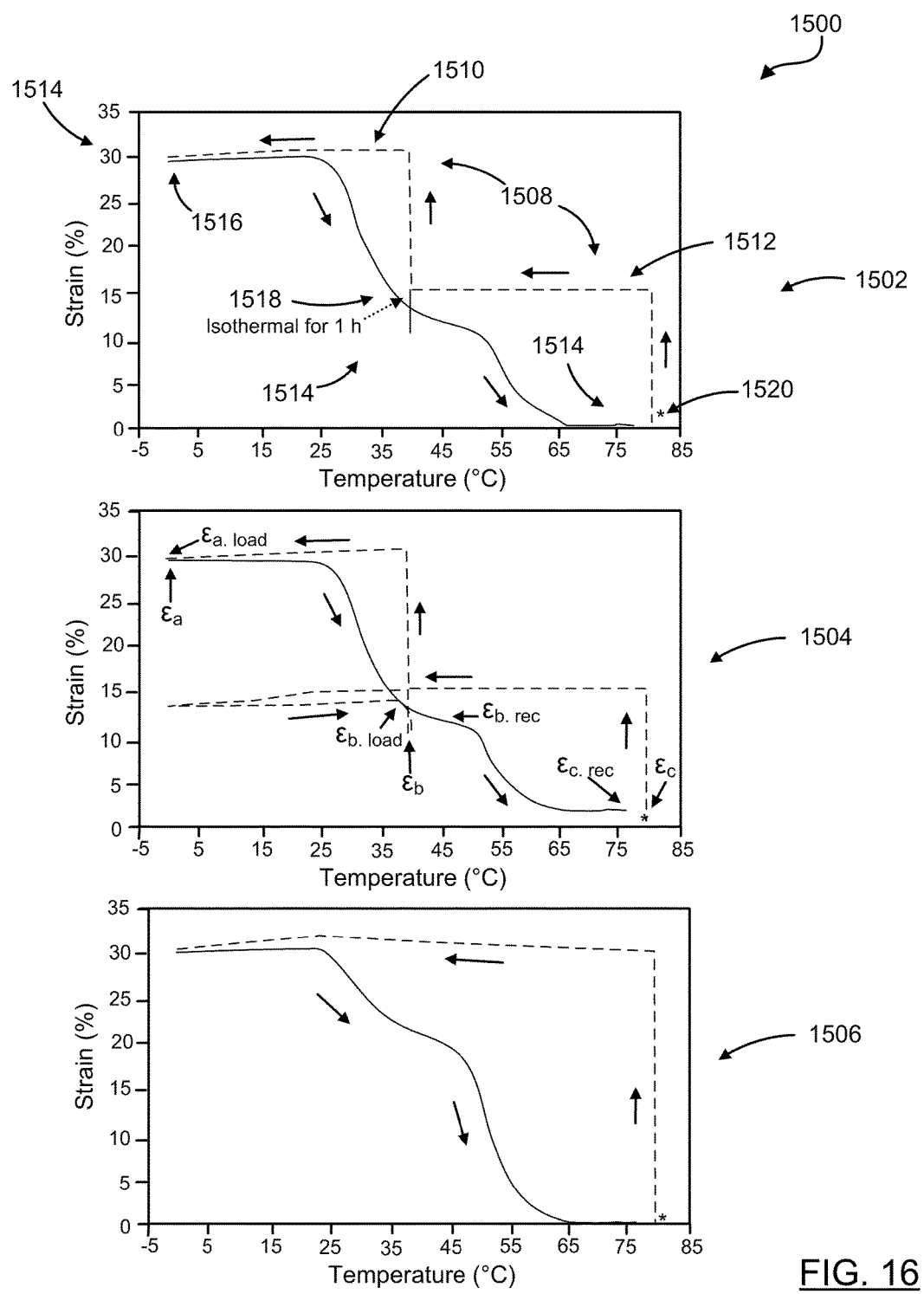
FIG. 16 depicts a shape memory cycle for an embodiment of a multi-shape product.

FIG. 16 (Appendix I) illustrates plots of triple-shape shape memory cycles ("SMCs") corresponding to different fixing protocols 1500 (or "fixing methods 1500"). The star in each graph indicates the onset of the SMC. Each of the methods 1500 operate on an embodiment of a multi-shape product (e.g., a product 100, 200, 800, and 900) comprising D30N70/PCL. More particularly, the methods 1500 comprise a first fixing method 1502, a second fixing method 1504, and a third fixing method 1506. Each of the methods 1500 comprise a number of fixing stages 1508, including in the present example a first fixing stage 1510 and a second fixing stage 1512. The fixing stages 1508 result in one or more shapes 1514. Here the shapes 1514 embody a first temporary shape 1516, a second temporary shape 1518, and a permanent shape 1520.

The triple-shape memory behavior of the multi-shape product utilizing a 40° C. annealing step was characterized quantitatively and the results described below and illustrated as the first fixing method 1502. A uni-axially loaded dumbbell specimen [ASTM D638 and illustrated as the product geometry 1400 in FIG. 15] of an example of D30N70/PCL was deformed at 80° C. (above both epoxy $T_g$ and PCL $T_m$) by ramping the force at 0.05 N/min, until a strain of 15% was achieved. The sample was cooled to 40° C. at 3° C./min while holding the external force constant, followed by an isothermal hold for 60 min. The external load was released by unloading the force back to 0.001 N (a small preload). This finished the fixing of the first temporary shape 1516 and is represented as the dashed line for the first fixing stage 1510 in the first fixing method 1502.

The shape memory testing continued by reloading the sample at 40° C. using the same force rate of 0.05 N/min until a strain of 30% was achieved. The temperature was further reduced to 0° C. followed by the second release of external force. This led to fixing of the second temporary shape 1518 and is shown as the green dashed line for the second fixing stage 1512 in the first fixing method 1502. Sequential recovery of the two fixed deformations—in reverse order—was triggered by heating the sample to 80° C. at 3° C./min (solid line in the first fixing method 1502). For the sake of clarity, this example designates the first temporary shape 1516 fixed at 40° C., the second temporary shape 1518 fixed at 0° C. and the permanent shape 1520.

It can be seen from the results of the first fixing method 1502 that, while the unloading at 40° C. led to some instantaneous strain recovery (incomplete fixing of the second temporary shape 1518), the fixing of the first temporary shape 1516 at 0° C. was almost perfect. The heating curve clearly showed two sequential recovery transitions, first from the first temporary shape 1516 to the second temporary shape 1518 and then from the second temporary shape 1518 to the permanent shape 1520. The two transition temperatures correlate well with the epoxy $T_g$ and PCL $T_m$, respectively.

Although this example of the first fixing method 1502 resulted in good triple-shape performance, in particular good fixing and recovery of the two temporary shapes, the lengthy isothermal step involved in the thermo-mechanical programming may render some practical applications difficult and/or be considered too time-consuming.

To overcome this, in another example, the second fixing method 1504 does not require any isothermal holding step and can dramatically increase the rate of shape fixing for the second temporary shape 1518. Similar to the fixing method discussed above, the second fixing method 1504 can involve loading the sample to 15% strain at 80° C. under the same force rate (0.05 N/min). The temperature was reduced continuously to 0° C. (instead of to 40° C. as in the first fixing method 1502), during which time both the epoxy vitrification and rapid PCL crystallization took place. Due to their existence as separate phases, these two processes do not interfere with each other.

The sample (also a uni-axially loaded dumbbell specimen (ASTM D638 with dumbbell geometry 1400 of FIG. 15] of an example of D30N70/PCL) was reheated to 40° C. with the epoxy passing through its glass transition to a rubbery state, while the PCL phase remained semi-crystalline since the temperature was still below its $T_m$ (see the heating DMA trace for D30N70/PCL in FIG. 13). In this example, the D30N70/PCL was at essentially the same state as the isothermally annealed material, but achieved with a much shorter time than in the previous method (ca. 33 min shorter with the current heating/cooling rate of 3° C.). The inventors note that, in reality, this time reduction can be more significant since the second method can be shortened by enhanced heat transfer (the selection of 3° C./min in the shape memory experiments was instrument-limited) while the first method requires at least 60 min due to slow crystallization kinetics (see, e.g., FIG. 14).

The external load was released at 40° C. to finish the fixing of the second temporary shape 1518, and the first fixing stage 1510 is plotted as the dashed line in the second fixing method 1504 of FIG. 15. The subsequent fixing of the first temporary shape 1316 as well as the recovery were conducted similarly to the first fixing method 1502. Briefly, the sample was reloaded to 30% strain at 40° C., cooled to 0° C., unloaded and finally heated to 80° C. for sequential recovery: the first temporary shape 1516→the second temporary shape 1518→the permanent shape 1520. The recovery profile (solid line in the second fixing method 1504) in the current method is indeed quite similar to the one in the first fixing method 1502.

The third fixing method 1506 achieves the triple-shape behavior in a process involving only a single fixing step. The corresponding SMC experiment was carried out as follows and with results shown in the third fixing method 1506. The sample (also a uni-axially loaded dumbbell specimen (ASTM D638 with dumbbell geometry 1400 of FIG. 15) of an example of D30N70/PCL) was stretched to 30% strain at 80° C., cooled to 0° C. while holding the external force, and unloaded to finish shape fixing (in this case, the fixing of the first temporary shape 1516). During heating (3° C./min to 80° C.), the strain recovered in two separate steps (solid line in the third fixing method 1506), indicating triple-shape behavior.

Observations similar to the third fixing method 1506 were reported by Behl et al. for their distinct approach using PCHMA-PCL copolymer networks (See Reference 13 below). The origin of this phenomenon lies in the fact that the fiber component (e.g., the PCL fibers) alone are not sufficient in fixing the total strain, explained further below, but are capable of resisting complete recovery of the shape memory component (e.g., the epoxy matrix) while they are in the semi-crystalline state. For example, when the deformed sample is cooled from 80° C. to 0° C., the strain (30%) is fixed by both PCL crystallization and epoxy vitrification. When the temperature is raised to epoxy $T_g$<T<PCL $T_m$, the devitrified epoxy matrix attempts to elastically recover to its equilibrium state. However, in the same temperature range the PCL fibers still exists as rigid, semi-crystalline fibers and is resisting the recovery of the epoxy matrix. As a consequence, the embodiment of the multi-shape product according to the third fixing method 1506 only recovers to the point at which the two competing factors balance each other (epoxy matrix recovery force=fiber component resistive force). This balance can account for the step-recovery seen in the third fixing method 1506. In one example, continued heating can release the remaining strain such as upon further heating to T>PCL $T_m$.

In one embodiment, the observed two-step recovery behavior is due to the fact that the PCL fibers can only partially resist the epoxy matrix recovery. If, on the other hand, the PCL fiber (and the fiber network generally) could resist about all (e.g., >99%) of the epoxy matrix recovery, i.e. fix all the temporary shapes (e.g., the first temporary shape 1516 and the second temporary shape 1518) on its own, the recovery at epoxy $T_g$ would not have been seen. In one example, this can be achieved through enhancing the mechanical stiffness of the fiber network and/or the constituent fibers (generating a larger resistive force) such as by densifying the fiber mat (increasing its wt-% in the composition) or introducing more inter-fiber bonding such as at nodes within the fiber network (See, respectively, References 20 and 21 below).

Understanding this, the inventors contend that the two-step recovery witnessed under the one-step fixing method (e.g., the third fixing method 1506) is not strictly a "triple-shape" phenomenon, since the first temporary shape 1516 is not separately defined in the thermo-mechanical cycle and the relative proportions of the two recovery transitions depend only on the relative mechanical contributions from the two components (e.g., the epoxy matrix and the PCL fibers) of this embodiment of the multi-shape product. It is a two-step recovery of a single temporary shape. Nevertheless, as also noted by Behl et al., this finding is still of merit and may find practical relevance to applications in which stepped recoveries are desired (See Reference 13 below).

Figure 17:
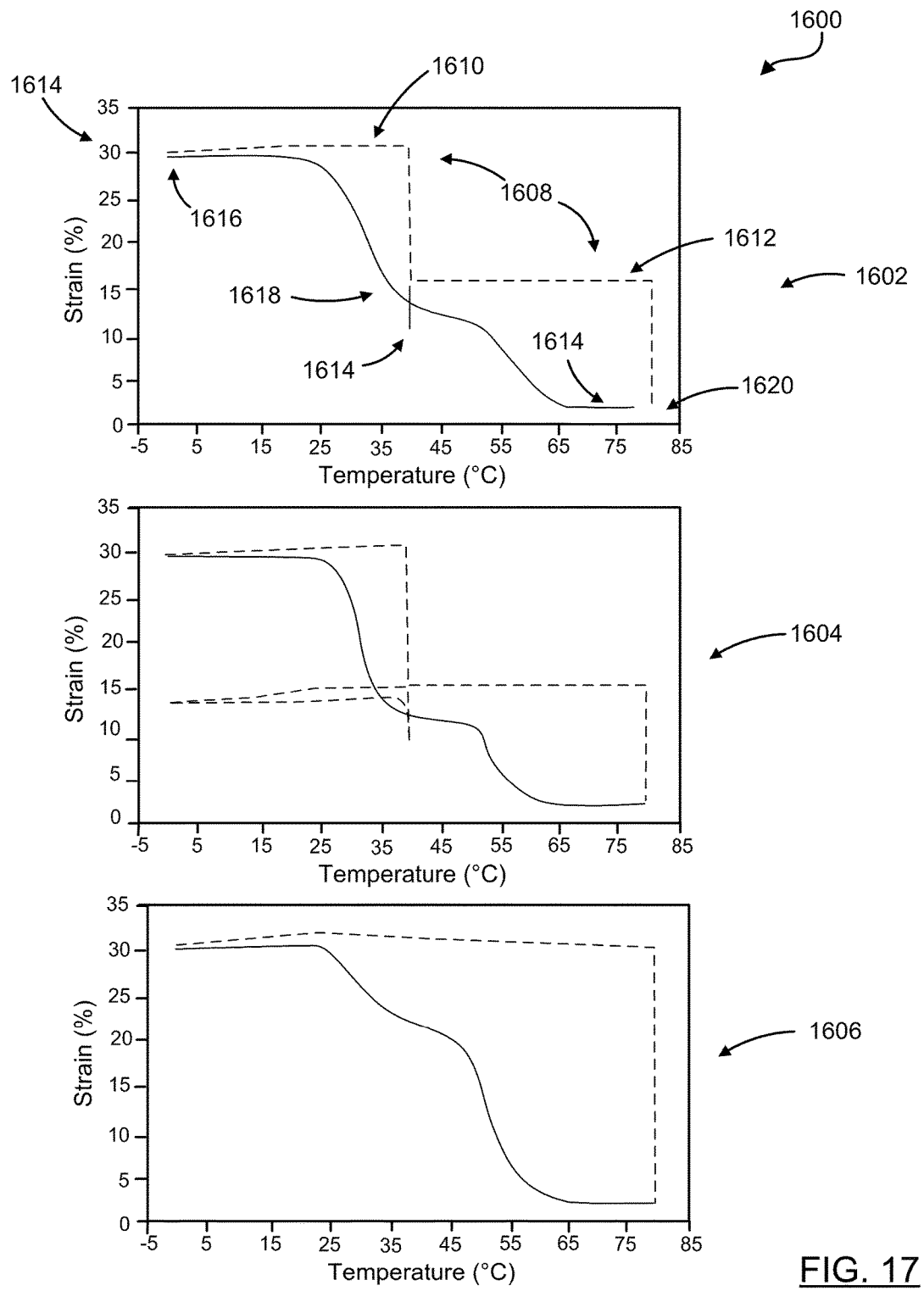
FIG. 17 depicts a shape memory cycle for an embodiment of a multi-shape product.
Figure 18:
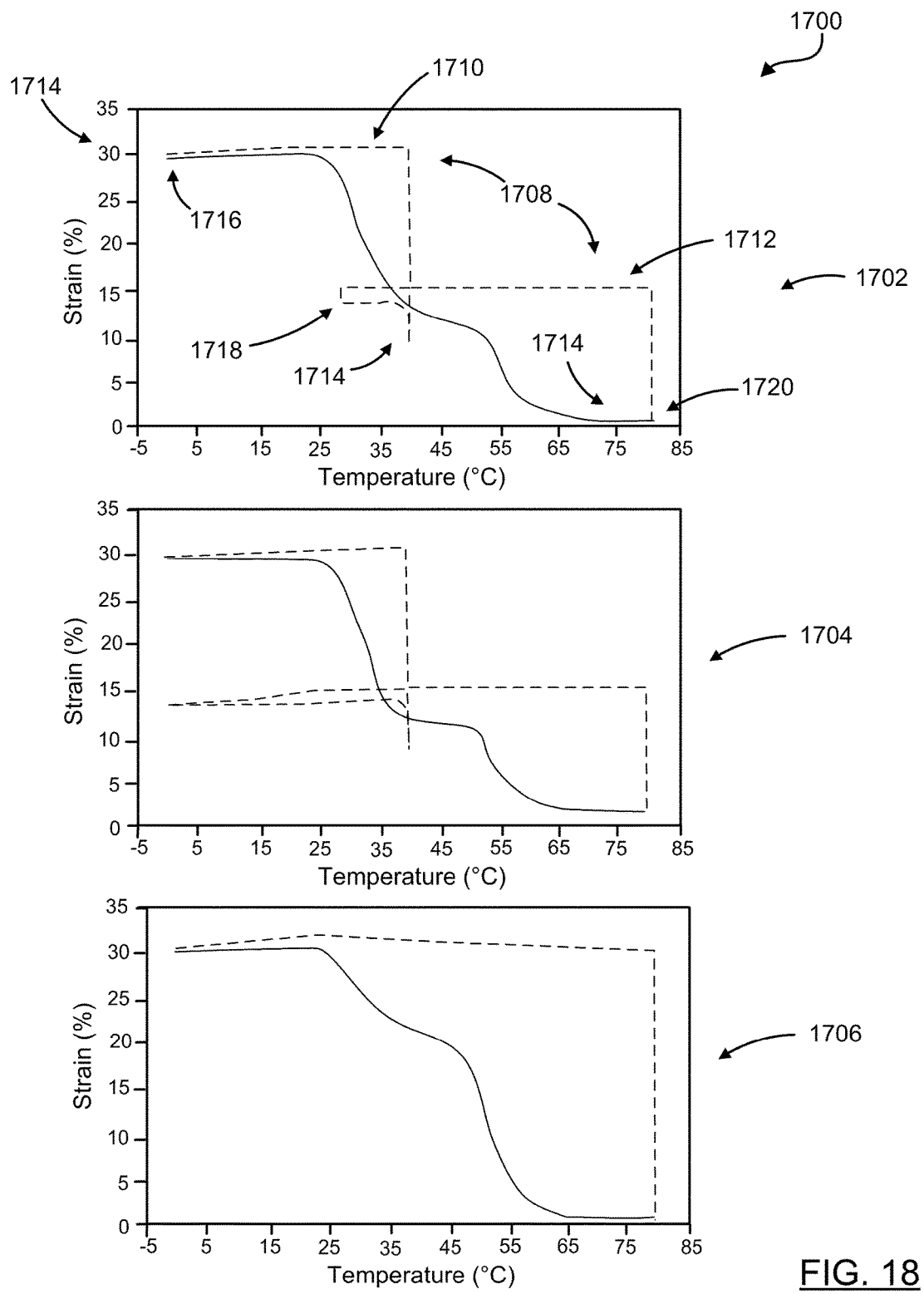
FIG. 18 depicts a shape memory cycle for an embodiment of a multi-shape product.

FIGS. 17 and 18 (Appendix N) illustrates plots of triple-shape shape memory cycles ("SMCs") for other embodiments of multi-shape products (e.g. the products 100, 200, 800, and 900) comprising, respectively, D20N80/PCL (FIG. 17) and D40N60/PCL (FIG. 18). Like numerals are used to identify like elements in FIG. 16 and each of FIGS. 17 and 18, except that the numerals are increased, respectively, by 100 in FIGS. 17 and 200 in FIG. 18.

For example, in FIG. 17, the fixing methods 1600 comprise a first fixing method 1602, a second fixing method 1604, and a third fixing method 1606. Each of the fixing methods 1600 comprise a number of fixing stages 1608, including a first fixing stage 1610 and a second fixing stage 1612. The fixing stages 1608 result in one or more shapes 1614. Here the shapes 1614 embody a first temporary shape 1616, a second temporary shape 1618, and a permanent shape 1620. Likewise in FIG. 18, the fixing methods 1700 comprise a first fixing method 1702, a second fixing method 1704, and a third fixing method 1706. Each of the methods 1700 comprise a number of fixing stages 1708, including a first fixing stage 1710 and a second fixing stage 1712. The fixing stages 1708 result in one or more shapes 1714. Here the shapes 1714 embody a first temporary shape 1716, a second temporary shape 1718, and a permanent shape 1720.

For D20N80/PCL (FIG. 17), the three fixing methods 1600 were substantially the same to D30N70/PCL shown in FIG. 16. In one example, for D40N60/PCL (FIG. 18), the deformation temperature for the first temporary shape 1716 was raised from 40° C. to 50° C. to accommodate its higher $T_g$ (see Table 2 above where DMA indentifies 41.37° C.). Specifically, in the exemplary first fixing method 1702, after the 60 min isothermal step at 40° C., the sample was heated to 50° C., unloaded, and then reloaded to 30%. In the exemplary second fixing method 1704, after cooling from 80° C. to 0° C., the sample was heated to 50° C. (instead of 40° C. as in the cases of D30N70/PCL (FIG. 16) and D20N80/PCL (FIG. 17)), unloaded and then reloaded to 30%.

Example 5

The triple-shape properties of embodiments of the multi-shape product comprising TSPCs can be further quantified by calculating the fixing ratios ($R_f$) and recovery ratios ($R_r$) for all the shape memory cycles ("SMCs") investigated.

In one example, these two characteristic ratios can be defined as shown in Equation (1) and Equation (2) below:

$$R_f(x) = \frac{\varepsilon_x}{\varepsilon_{x,load}} \times 100\% \quad \text{Equation (1)}$$

$$R_r(x \rightarrow y) = \frac{\varepsilon_x - \varepsilon_{y,rec}}{\varepsilon_x - \varepsilon_y} \times 100\% \quad \text{Equation (2)}$$

where $\varepsilon_{x,load}$, $\varepsilon_x$, and $\varepsilon_{x,rec}$ stand for, respectively, the strain before unloading, the strain after unloading, and the strain after recovery for shape x (x can be the first temporary shape, the second temporary shape, and the permanent shape, the same for y).

For the permanent shape, $\varepsilon_c$ is simply the starting strain (primarily thermal strain). $\varepsilon_{y,rec}$ for the second temporary shape is determined from the midpoint of the intermediate plateau in the recovery curve. All of the strains involved in these calculations are labeled for the second fixing method discussed and illustrated in FIGS. 16-18. Two $R_f$ values corresponding to the fixing of the first temporary shape and the second temporary shape, and three $R_r$ values for the recoveries from the first temporary shape to the second temporary shape, the second temporary shape to the permanent shape, and the first temporary stage and the permanent shape, can be calculated.

Table 4 summarizes results for three multi-shape products comprising D20N80/PCL, D30N70PCL, and D40N60/PCL, samples of which are discussed in connection with Examples 2-4 and FIGS. 12-18. Table 4 identifies each of the shapes (e.g., the temporary shapes and the permanent shape) with letters, where (a) refers to the first temporary shape, (b) refers to the second temporary shape, and (c) refers to the permanent shape.

TABLE 4

| Sample | Fixing Method | $R_f$(a) | $R_f$(b) | $R_r$(a→b) | $R_r$(b→c) | $R_r$(a→c) |
|---|---|---|---|---|---|---|
| D20N80/PCL | Method 1 | 98.7 | 74.4 | 89.8 | 91.5 | 97.3 |
| | Method 2 | 98.7 | 76.7 | 90.1 | 92.9 | 97.8 |
| | Method 3 | 99.4 | — | — | — | 96.2 |
| D30N70/PCL | Method 1 | 99.0 | 73.9 | 93.4 | 102.1 | 100.7 |
| | Method 2 | 97.0 | 73.5 | 91.6 | 101.8 | 100.6 |
| | Method 3 | 99.3 | — | — | — | 99.5 |
| D40N60/PCL | Method 1 | 99.2 | 64.1 | 88.8 | 99.5 | 99.8 |
| | Method 2 | 99.2 | 59.8 | 89.3 | 98.3 | 99.5 |
| | Method 3 | 99.5 | — | — | — | 99.7 |

It can be seen from Table 4 that among embodiments of the multi-shape products comprising TSPCs, the fixing of the first temporary shape (a) and all the shape recoveries are nearly perfect ($R_f$(a) and $R_r$ values close to 100%). As discussed above, the incomplete fixing of the second temporary shape (b) may be due to the insufficiency of the PCL fiber network to resist all the matrix recovery at epoxy $T_g < T < $ PCL $T_m$, and can be improved via enhancing the mechanical stiffness of fiber component (e.g., the PCL fibers) by various means, some of which are suggested herein.

Example 6

Figure 19:
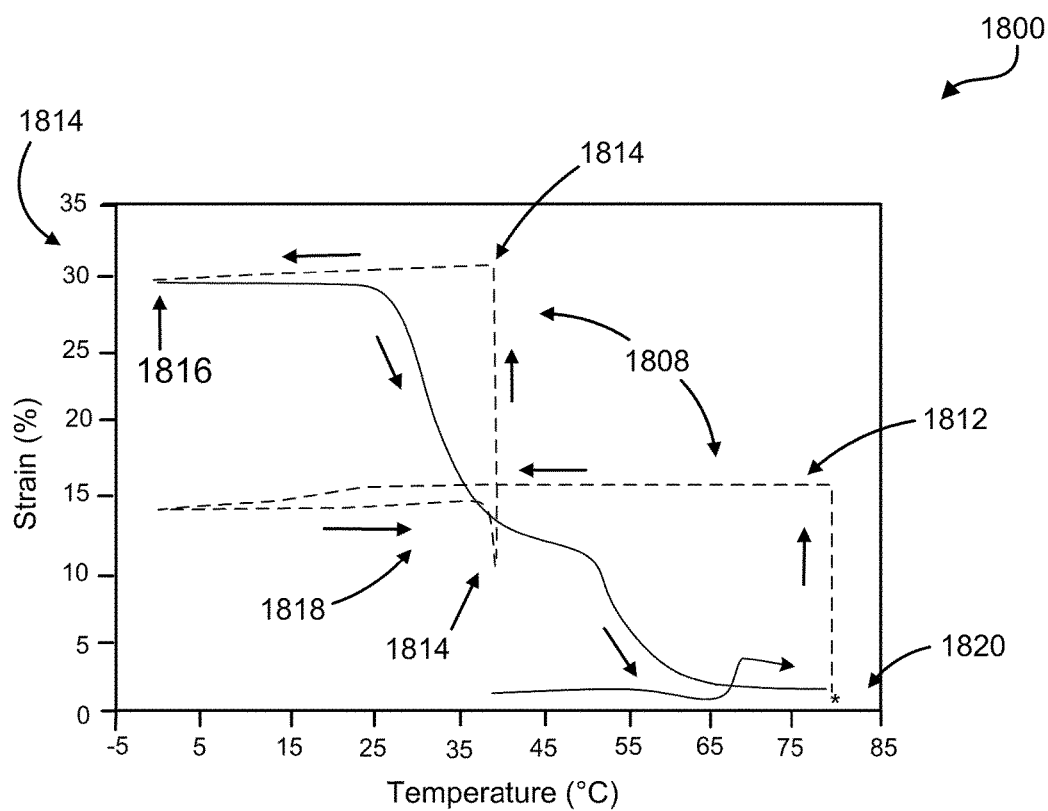
FIG. 19 depicts a shape memory cycle for an embodiment of a multi-shape product.

FIG. 19 (Appendix K) illustrates a plot of a triple-shape shape memory cycle ("SMCs") for an embodiment of a multi-shape product (e.g. the products 100, 200, 800, and 900) comprising, respectively, D30N70/PCL. Like numerals are used to identify like elements in FIGS. 16-18 and FIG. 19, except that the numerals are increased (e.g., 1600 in FIG. 17 is now 1800 in FIG. 19). For example, the fixing method 1800 has a number of fixing stages 1808, including a first fixing stage 1810 and a second fixing stage 1812. The fixing stages 1808 result in one or more shapes 1814. Here the shapes 1814 embody a first temporary shape 1816, a second temporary shape 1818, and a permanent shape 1820.

Figure 20:
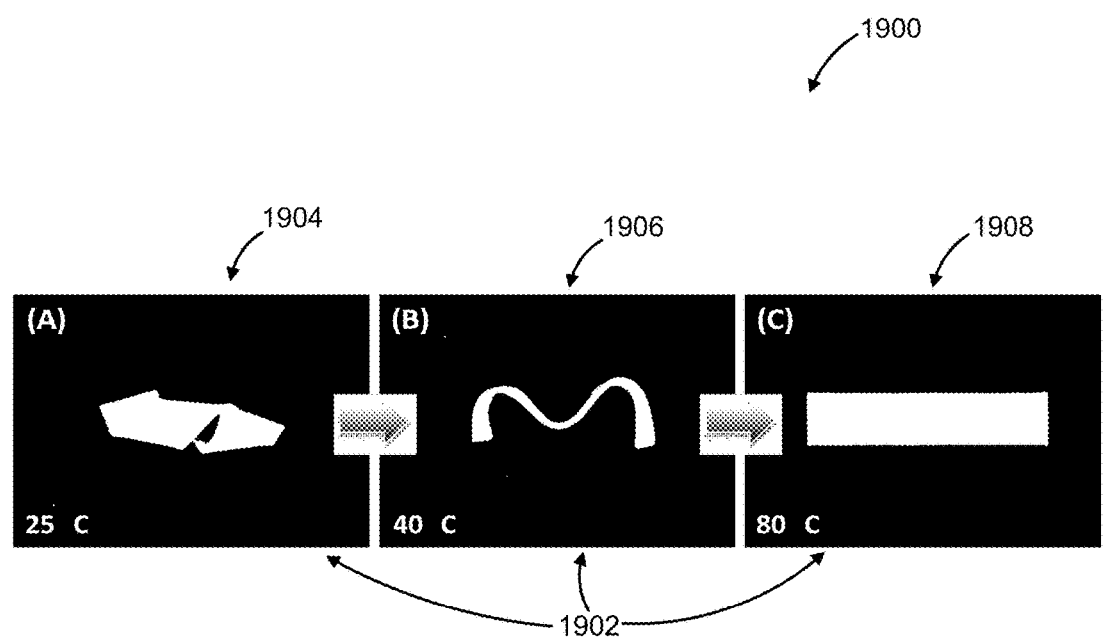
FIG. 20 depicts images of the multi-shape product of FIG. 19.

FIG. 20 (Appendix K) depicts a series of images showing sequential recovery of a multi-shape product 1900, which is similar to the products 100, 200, 800, and 900 discussed above and which undergoes the fixing method 1800 of FIG. 19. In FIG. 20, the product 1900 has a plurality of shapes 1902. The shapes 1902 comprise a first temporary shape 1904, a second temporary shape 1906, and a permanent shape 1908. The shapes 1902 correspond to one of the shapes 1814 (of FIG. 19), and more particularly, the first temporary shape 1904 corresponds to the first temporary shape 1816, the second temporary shape 1906 corresponds to the second temporary shape 1818, and the permanent shape 1908 corresponds to the permanent shape 1820.

With continued reference to FIGS. 19 and 20, in the present example, a fully cured D30N70/PCL sample was cut into a rectangular film of dimensions 30 mm×6.8 mm×0.6 mm (see the permanent shape 1908 (FIG. 20). A fixing protocol similar to the second fixing method 1504 (FIG. 16) discussed in Example 4 above was utilized for shape fixing. More particular to this example the sample was immersed in a water bath at 80° C., deformed to an "M" shape (the second temporary shape 1906), and quenched in a second bath with ice/water mixture at 0° C.

The sample was also immersed into a third water bath at 40° C., after which the sample showed some minor recovery due to the incomplete fixing of PCL in this embodiment, but a major part of deformation was retained (since $R_f$(b) in Table 4 is still greater than 70%) and the second temporary shape 1906 was fixed. Maintaining the sample temperature at 40° C., the sample was further manipulated by winding around a glass rod and immersed into the ice/water bath again. This led to fixing of the first temporary shape 1904. After immersing the sample with the first temporary shape 1904 back into the water bath at 40° C., it quickly recovered to the second temporary shape 1906, which further recovered to the permanent shape 1908 after immersing into the water bath at 80° C.

(4) EXPERIMENTAL IMPLEMENTATION

Examples 1-6 of the Experimental Results employ various techniques and materials. Additional and/or supplemental details of these techniques and materials are discussed under the headings A-G below.

A. Materials:

All chemicals used, including diglycidyl ether of bisphenol-A (DGEBA), neopentyl glycol diglycidyl ether (NGDE), poly(propylene glycol)bis(2-aminopropyl)ether (Jeffamine D230) and poly(ε-caprolactone) (PCL; nominal $M_w$=65,000 g/mol) were purchased from Sigma-Aldrich and used as received.

B. Electrospinning of PCL:

In the present examples, the solution for electrospinning was prepared by dissolving 2 g PCL pellets in a 10 ml mixed chloroform/DMF solvent ($V_{chloroform}$: $V_{DMF}$=8:2). Electrospinning (see, e.g., block 408 of FIG. 5) was conducted using a custom-built setup (e.g., the manufacturing system 500 of FIG. 5) that consists of a high voltage power supply (Agilent E3630A), a syringe pump (KDS100, KD Scientific) and a rotating drum collector. A constant flow rate of 1 ml/h, along with an applied voltage of 15 kV and a tip-to-collector distance of 10 cm was used. The collecting drum (diameter of 5 cm) was rotated at a constant velocity of 400 RPM with a slow, oscillatory horizontal translation with an amplitude of 6 cm that yields uniform mat thicknesses.

C. Fabrication of Multi-Shape Products (Also "Triple-Shape Polymeric Composites"):

In the present examples, the Epoxy/PCL TSPCs were fabricated following a method similar to previous reports for other electro-spun composites (See References 18 and 20 below). DGEBA was first preheated at 70° C. to melt all the crystals that may be present. NGDE and Jeffamine D-230 of calculated amounts were added and quickly mixed by vigorous manual stirring with a glass rod (~1 min) until a clear, colorless and low-viscosity mixture was obtained. A piece of electro-spun PCL fiber mat with known mass was submerged in the resin mixture and maintained there for 20-30 min (see, e.g., block 410 of FIG. 5). After carefully removing the extra resin on the surfaces, the resin-loaded composite was cured at 40° C. for >72 h (see, e.g., block 406 of FIG. 5)

D. Morphological Characterization:

In the present examples, scanning electron microscopy (SEM) was used to study the morphologies of electro-spun PCL fiber mat and Epoxy/PCL TSPCs. For the latter, a fully cured composite was cryogenically fractured in liquid nitrogen to preserve the bulk morphology. Both the top surface of an as-spun PCL mat and the fractured surface of the TSPC were sputter coated with gold and examined by a JEOL JSM5600 SEM instrument. A typical accelerating voltage of 10 kV was used.

E. Thermal Characterization:

In the present examples, the thermal properties of Epoxy/PCL composites as well as neat epoxy samples were characterized using differential scanning calorimetry (DSC). Samples (typical mass ~3-5 mg) were encapsulated in Tzero™ aluminum pans and examined on a Q200 (TA Instruments) DSC instrument. For each experiment, the sample was first heated from −40° C. to 120° C., cooled back to −40° C., and finally heated to 120° C. All heating/cooling rates were 10° C./min. The epoxy $T_g$ and PCL $T_m$ were determined from the midpoint of the step transition and the melting peak temperature, respectively. The melting enthalpy ($\Delta H_m$) was calculated by integrating the melting peak.

F. Dynamic Mechanical Analysis (DMA):

In the present examples, the thermo-mechanical properties of Epoxy/PCL composites were characterized using a Q800 DMA (TA Instruments). In each case, a rectangular film was loaded under tension and an oscillatory deformation with an amplitude of 10 μm, a frequency of 1 Hz and a "force track" (ratio of static to dynamic force) of 108% was applied. The temperature was first equilibrated at −90° C., ramped to 150° C. at a linear rate of 3° C./min, kept isothermal for 5 min and finally ramped back to −90° C. at the same rate. The epoxy $T_g$ and PCL $T_m$ were determined from the onset points of storage modulus (E') transitions.

G. Shape Memory Characterization:

In the present examples and embodiments, quantitative characterization of triple-shape properties was conducted using the same Q800 DMA instrument under controlled force mode. Since the experiments involved large-strain tensile deformations, a dumbbell geometry (e.g., the dumbbell geometry 1402 of FIG. 15) guided by ASTM D638 was adopted (detailed dimensions are provided in Table 3 above). The sample thickness varied between 0.6 to 0.7 mm.

(5) ADDITIONAL EMBODIMENTS

A small sample of products and methods are described herein as follows:

A1. A method comprising heating a multi-shape product to a first temperature, applying a first load at the first temperature to deform the multi-shape product to a first temporary shape, cooling the multi-shape product to a second temperature allowing for fixing of the first temporary shape, applying a second load at the second temperature to deform the multi-shape product to a second temporary shape, and cooling the product to a third temperature allowing fixing of the second temporary shape.

A2. A method according to A1, further comprising ramping the first load to a first strain.

A3. A method according to A2, wherein the first strain is about 15%.

A4. A method according to A1, wherein the first temperature is greater than the second temperature.

A5. A method according to A1, further comprising ramping the second load to a second strain.

A6. A method according to A5, wherein the second strain is about 30%.

A7. A method according to A1, further comprising unloading the product to remove the first load.

A8. A method according to A7, wherein the first load is reduced to about 0.005 N or less.

A9. A method according to A1, wherein the product is cooled from the first temperature to the second temperature to affix the first temporary shape.

A10. A method according to A1, wherein the third temperature is at or below room temperature.

A11. A method according to claim A1, wherein the product is cooled to about 0° C.

A12. A method according to claim A1, wherein heating and loading occurs simultaneously.

B1. A method of deforming a multi-shape product into a plurality of temporary shapes, said method comprising heating the multi-shape product to a first temperature, applying a first load to deform the multi-shape product to a first temporary shape, cooling the multi-shape product to a second temperature, heating the multi-shape product to a third temperature, and applying a second load to deform the multi-shape product to a second temporary shape, wherein the third temperature is greater than the second temperature and less than the first temperature.

B2. A method according to B1, wherein the multi-shape product comprises a shape memory material and a fiber network, and wherein the second temperature induces vitrification of the shape memory material and crystallization of the fiber network.

B3. A method according to B1, wherein at the third temperature the shape memory material is in a compliant state and the fiber network remains in a semi-crystalline state.

B4. A method according to B2, wherein the third temperature is below the melting temperature $T_m$ of the fiber network B5. A method according to B2, wherein the third temperature is greater than the glass transition temperature $T_g$ of the shape memory material.

B6. A method according to B1, further comprising unloading the multi-shape product at the second temperature.

C1. A multi-shape product having a permanent shape, a first temporary shape, and a second temporary shape, said multi-shape product comprising a composition that sequentially recovers from the first temporary shape to the second temporary shape to the permanent shape in response to continuous heating.

C2. A multi-shape product according to C1, wherein recovery from the first temporary shape to the second temporary shape occurs at a first temperature and recovery from the second temporary shape to the permanent shape occurs at a second temperature, and wherein the second temperature is greater than the first temperature.

C3. A multi-shape product according to C1, wherein the composition comprises a shape memory component and a fiber network interpenetrating the shape memory component.

C4. A multi-shape product according to C3, wherein recovery from the first temporary shape to the second temporary shape initiates proximate the glass transition temperature $T_g$ of the shape memory component.

C5. A multi-shape product according to C3, wherein recovery from the second temporary shape to the permanent shape initiates proximate the melting temperature $T_m$ of the fiber network.

C6. A multi-shape product according to claim C1, wherein the composition comprises one or more of covalently cross-linked amorphous polymers, covalently cross-linked semi-crystalline polymers, physically cross-linked polymers with amorphous switching phase, and physically cross-linked polymers with semi-crystalline switching phases.

C7. A multi-shape product according to claim C1, wherein the composition comprises one or more of semi-crystalline and amorphous polymers that have a thermal transition that mobilizes the polymer to a fluid state.

Where applicable it is contemplated that numerical values, as well as other values that are recited herein are modified by the term "about," whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

(6) REFERENCES

[1] A. Lendlein, S. Kelch, *Angew. Chem., Int. Ed.* 2002, 41, 2034.
[2] C. Liu, H. Qin, P. T. Mather, *J. Mater. Chem.* 2007, 17, 1543.
[3] P. T. Mather, X. F. Luo, I. A. Rousseau, *Annu. Rev. Mater. Res.* 2009, 39, 445.
[4] I. A. Rousseau, *Polym. Eng. Sci.* 2008, 48, 2075.
[5] A. Lendlein, H. Y. Jiang, O. Junger, R. Langer, *Nature* 2005, 434, 879.
[6] Y. J. Liu, H. B. Lv, X. Lan, J S Leng, S. Y. Du, *Compos. Sci. Technol.* 2009, 69, 2064.
[7] B. Yang, W. M. Huang, C. Li, L. Li, *Polymer* 2006, 47, 1348.
[8] H. B. Lv, J. S. Leng, Y. J. Liu, S. Y. Du, *Adv. Eng. Mater.* 2008, 10, 592.
[9] R. Mohr, K. Kratz, T. Weigel, M. Lucka-Gabor, M. Moneke, A. Lendlein, *Proc. Natl. Acad. Sci. USA* 2006, 103, 3540.
[10] H. H. Qin, P. T. Mather, *Macromolecules* 2009, 42, 273.
[11] I. Kundler, H. Finkelmann, *Macromol. Rapid Commun.* 1995, 16, 679.
[12] T. Chung, A. Romo-Uribe, P. T. Mather, *Macromolecules* 2008, 41, 184.
[13] M. Behl, I. Bellin, S. Kelch, W. Wagermaier, A. Lendlein, *Adv. Funct. Mater.* 2009, 19, 102.
[14] I. Bellin, S. Kelch, R. Langer, A. Lendlein, *Proc. Natl. Acad. Sci. USA* 2006, 103, 18043.
[15] I. Bellin, S. Kelch, A. Lendlein, *J. Mater. Chem.* 2007, 17, 2885.
[16] T. Xie, X. C. Xiao, Y. T. Cheng, *Macromol. Rapid Commun.* 2009, 30, 1823.
[17] S. Y. Jang, V. Seshadri, M. S. Khil, A. Kumar, M. Marquez, P. T. Mather, G. A. Sotzing, *Adv. Mater.* 2005, 17, 2177.
[18] X. F. Luo, P. T. Mather, *Macromolecules* 2009, 42, 7251.
[19] T. Xie, I. A. Rousseau, *Polymer* 2009, 50, 1852.
[20] J. Choi, K. M. Lee, R. Wycisk, P. N. Pintauro, P. T. Mather, *Macromolecules* 2008, 41, 4569.
[21] S. J. Lee, S. H. Oh, J. Liu, S. Soker, A. Atala, J. J. Yoo, *Biomaterials* 2008, 29, 1422.

What is claimed is:

1. A multi-shape product, comprising:
   a first component forming a matrix and comprised of a shape memory polymer having a shape memory recovery temperature;
   a second component forming a fiber network having a plurality of fibers, a plurality of nodes where fibers contact each other, and a plurality of interstitial voids between the fibers, wherein said fibers comprise a polymer having a transition temperature that is within 50 degrees Celsius of said shape memory recovery temperature; and
   wherein said fiber network is embedded in the matrix so that said matrix fills the plurality of interstitial voids.

2. A multi-shape product according to claim 1, wherein the second component can be electro-spun.

3. A multi-shape product according to claim 2, wherein the second component comprises a one or more semi-crystalline polymers.

4. A multi-shape product according to claim 2, wherein the second component comprises poly(ε-caprolactone).

5. A multi-shape product according to claim 1, wherein the first component comprises a shape memory polymer.

6. A multi-shape product according to claim 5, wherein the first component comprises epoxy.

7. A multi-shape product according to claim 1, wherein the composition exhibits sequential recovery through the plurality of temporary shapes to the permanent shape in response to continuous heating, wherein recovery from each of the temporary shapes initiates at one or more points during heating.

8. A multi-shape product according to claim 7, wherein at each point one or more of the first component and the second component changes from a first state to a second state.

9. A multi-shape product according to claim 7, wherein the one or more points comprise a first point proximate a glass transition temperature Tg of the first component.

10. A multi-shape product according to claim 7, wherein the one or more points comprise a second point proximate a melting temperature Tm of the second component.

11. A multi-shape product, comprising:
- a first component forming a matrix and comprised of a shape memory polymer having a shape memory recovery temperature;
- a second component forming a fiber network having a plurality of fibers with an average diameter that is about 100 μm or less, a plurality of nodes where fibers contact each other, and a plurality of interstitial voids between the fibers, wherein said fibers comprise a polymer having a transition temperature that is within 50 degrees Celsius of said shape memory recovery temperature; and
- wherein said fiber network is embedded in the matrix so that said matrix fills the plurality of interstitial voids.

12. A multi-shape product according to claim 11, wherein the second component can be electro-spun.

13. A multi-shape product according to claim 11, wherein the second component comprises a semi-crystalline polymer.

14. A multi-shape product according to claim 11, wherein the second component comprises poly($\epsilon$-caprolactone).

15. A multi-shape product according to claim 11, wherein the composition exhibits sequential recovery through the plurality of temporary shapes to the permanent shape in response to continuous heating, wherein recovery from each of the temporary shapes initiates at one or more points during heating.

16. A multi-shape product according to claim 15, wherein at each point one or more of the first component and the second component changes from a first state to a second state.

17. A multi-shape product according to claim 15, wherein the one or more points comprise a first point proximate a glass transition temperature Tg of the first component.

18. A multi-shape product according to claim 15, wherein the one or more points comprise a second point proximate a melting temperature Tm of the second component.

* * * * *